United States Patent
Yim et al.

(10) Patent No.: US 12,488,061 B2
(45) Date of Patent: Dec. 2, 2025

(54) MITIGATING LATENCY AND/OR RESOURCE USAGE IN TRIGGERING ACTIONABLE SUGGESTIONS RELATED TO RENDERED CONTENT

(71) Applicant: GOOGLE LLC, Mountain View, CA (US)

(72) Inventors: Keun Soo Yim, San Jose, CA (US); Bogdan Caprita, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 359 days.

(21) Appl. No.: 17/970,353

(22) Filed: Oct. 20, 2022

(65) Prior Publication Data

US 2024/0028662 A1     Jan. 25, 2024

Related U.S. Application Data

(60) Provisional application No. 63/390,589, filed on Jul. 19, 2022.

(51) Int. Cl.
| | | |
|---|---|---|
| G06F 16/95 | (2019.01) | |
| G06F 16/957 | (2019.01) | |
| G06Q 30/0601 | (2023.01) | |

(52) U.S. Cl.
CPC ..... G06F 16/9577 (2019.01); G06Q 30/0631 (2013.01)

(58) Field of Classification Search
CPC .............. G06F 16/9577; G06Q 30/0631
See application file for complete search history.

(56) References Cited

U.S. PATENT DOCUMENTS

| | | | | |
|---|---|---|---|---|
| 2004/0205514 A1* | 10/2004 | Sommerer | ............ | G06F 40/106 715/205 |
| 2009/0240683 A1* | 9/2009 | Lazier | ................ | G06F 16/3325 707/999.005 |
| 2010/0205523 A1 | 8/2010 | Lehota et al. | | |
| 2011/0197124 A1* | 8/2011 | Garaventa | ............. | G06F 16/972 715/234 |
| 2011/0238524 A1* | 9/2011 | Green | ................ | G06Q 30/0641 705/26.7 |
| 2013/0246904 A1 | 9/2013 | Seliger et al. | | |
| 2016/0110082 A1* | 4/2016 | Zhang | ................ | G06Q 30/0275 715/765 |

(Continued)

OTHER PUBLICATIONS

Dennis Gaebel, "Intersection Observer: Track Elements Scrolling Into View" Tuts+. Retrieved from https://webdesign.tutsplus.com/tutorials/how-to-intersection-observer-cms-30250. 11 pages, dated Jan. 9, 2018.

(Continued)

*Primary Examiner* — Hope C Sheffield
(74) *Attorney, Agent, or Firm* — Gray Ice Higdon

(57) ABSTRACT

Implementations relate to triggering suggestion(s) for a document that is at least partially displayed by a content access application at a user interface of a client computing device. The suggestions(s) can be triggered when one or more triggering conditions that provide when to trigger the suggestion(s) are satisfied. The one or more triggering conditions can include, for example, a coordinate condition, a DOM node condition, and/or a temporal condition.

20 Claims, 11 Drawing Sheets

(56) References Cited

U.S. PATENT DOCUMENTS

2021/0081470 A1    3/2021  Fisher et al.
2021/0357398 A1*  11/2021  Balakavi ........... G06F 16/24578
2022/0004358 A1*   1/2022  Facey ..................... A63F 13/35

OTHER PUBLICATIONS

Changsin Lee, "How to find the screen coordinates of a web element" Medium. Retrieved from https://changsin.medium.com/how-to-find-the-screen-coordinates-of-a-web-element-84ce0f7b0092. 7 pages, dated Jan. 30, 2022.
European Patent Office; International Search Report and Written Opinion issued in Application No. PCT/US2022/080991; 15 pages; dated Mar. 24, 2023.

\* cited by examiner

MITIGATING LATENCY AND/OR RESOURCE USAGE IN TRIGGERING ACTIONABLE SUGGESTIONS RELATED TO RENDERED CONTENT

BACKGROUND

To access Internet resources or other electronic documents for information, a user often launches an application and navigates to the document. For example, the user can launch a web browser and navigate to an Internet resource by performing a search or entering a Uniform Resource Locator (URL) address for the Internet resource. An example Internet resource is a web page, typically written in a markup language such as Hypertext Markup Language (HTML) or Extensible Markup Language (XML).

Suggestions have been proposed that are related to content of an electronic document being rendered at an interface of a client device and that are provided, at the interface, while the electronic document is being rendered. For example, while a first web page is being viewed, a suggestion for a second web page, determined to be related to the first web page, can be provided and, if selected, can cause navigation to the second web page.

However, such suggestions are often suggestions to view related content and are not suggestions to perform action(s) (e.g., automated assistant action(s)) that are based on content of the electronic document being rendered and that are distinct from merely navigating to related content. Additionally or alternatively, such suggestions are often rendered in a static manner. For example, they may be rendered as soon as the underlying web page is accessed, or after certain fixed conditions are satisfied, such as scrolling through a fixed percentage of the web page. The static rendering of a related content interface notification in a static manner can result in notifications being rendered too soon or too late (or not at all) during access of the underlying web page. When rendered too soon, the related content interface notification can occupy often limited screen real estate and/or cause a user to temporarily divert from viewing the web page, both of which can prolong the amount of time it takes for the user to view relevant portions of the web page—leading to increased usage of client device resources in rendering the web page. When rendered too late or not at all, a user can ignore or not even be presented with the notification and, instead, seek related content through more computer resources and/or network intensive means (e.g., performing Internet searching).

SUMMARY

Some implementations disclosed herein relate to determining triggering condition(s) that, when satisfied, will cause a client device to render suggestion(s) (e.g., actionable suggestion(s)) for a document (e.g., a web page, a portable document format (PDF) document, a screen of an app) that is displayed by the client device. Some implementations disclosed herein additionally or alternatively relate to monitoring for satisfaction of determined triggering condition(s) for suggestion(s) for a document and, in response to determining satisfaction of one or more of the triggering condition(s) (e.g., occurrence of any of multiple triggering condition(s)), causing the suggestion(s) to be rendered along with display of the document.

Various implementations disclosed herein determine triggering condition(s) dynamically on, e.g., a document-by-document basis and/or a client-device-by-client-device basis, to cause rendering of suggestion(s) when they are likely to be interacted with. Some of those various implementations mitigate occurrences of late provision of suggestion(s) and/or occurrences of early provision of suggestion(s), and mitigate associated technical drawbacks of each. Various implementations disclosed herein additionally or alternatively determine trigger condition(s) whose satisfaction can be monitored for, locally at a client device, in a manner that is resource (e.g., processor, memory, and/or battery resource(s)) efficient for the client device. Some of those various implementations provide for dynamic triggering of suggestion(s) by the client device, while mitigating usage of often constrained resource(s) of the client device.

In some implementations, the triggering condition(s) that are generated and utilized for a given suggestion for a given document being rendered at a given client device can include a coordinate condition, a document object model (DOM) condition (sometimes also referred to as "DOM node condition"), and/or a temporal condition. In some of those implementations, only one of the triggering condition(s) can be determined and utilized. In some other implementation(s), multiple triggering condition(s) (e.g., those of this paragraph and/or other triggering condition(s)) can be utilized and whichever is determined to be satisfied first can cause the given suggestion to be rendered.

As a working example for illustrating aspects of generating and/or utilizing the coordinate, DOM, and temporal conditions, assume a web page that relates to a recipe for cooking an entree, and that the web page includes: a first section that provides an overview of the entree; a second section (that follows the first) that provides a list of the ingredients for the entree; a third section (that follows the second) that includes a list of the kitchen tools needed for the entree; a fourth section (that follows the third) that includes step-by-step directions for cooking the entree; and a fifth section that includes optional variations for cooking the entree.

In the working example, an actionable suggestion for the web page can be an interface element that, when selected (e.g., tapped, clicked, or voice-selected), causes an automated assistant to add the ingredients, from the web page, to a shopping list maintained by the automated assistant and/or to interface with a separate application (e.g., a note taking application) to automatically add the ingredients, from the web page, to a shopping list of the separate application. For example, the actionable suggestion can display the text "click to add these ingredients to note taking app". When a user selects the actionable suggestion, an automated assistant can extract the ingredients from markup language of the web page (e.g., using tag(s) of the markup language), or can access a pre-extracted listing of the ingredients, and interface with the separate application (e.g., via an API) to cause those ingredients to be added to a list in the separate application. Optionally, the shopping list maintained by the assistant need not be brought to the foreground in adding the ingredients and/or the separate application need not be executed, at least in the foreground, when interfaced with by the automated assistant to add the ingredients. Further, such an actionable suggestion can prevent the need for a user to manual copy the ingredients from the web page and copy them into a corresponding list, which can involve many user inputs (vs. a single selection of the actionable suggestion) and/or can require switching back and forth between multiple interfaces (e.g., between a browser application and the separate application). Switching back and forth between interfaces can be time consuming, thereby causing prolonged usage of client device resources (e.g., battery) needed to e.g., render content from the applications.

Continuing with the working example, and turning to the coordinate condition, a client device can, in response to accessing the web page (or receiving a request to access the web page), transmit, to a server computing device: document information for the web page and user interface information for the client device. The document information can be, for example, a uniform resource identifier (URI) or other identifier of the web page and/or at least some of the markup language of the web page. The user interface information can identify, directly or indirectly, a type of the user interface (e.g., smartphone, tablet, laptop, small smartphone, large smartphone, etc.), dimensional information of the user interface (e.g., 5" vertical by 3.5" wide), orientation information for the user interface (e.g., vertical or horizontal), font size and/or type (e.g., default font setting: Times New Roman, font size 11) for the user interface, whether ad blockers are on or off, and/or other user interface information.

The server computing device can utilize the document information to determine the actionable suggestion for the web page. For example, where the document information includes a URI, the actionable suggestion can be pre-indexed with the URI. For instance, the server computing device (or another device) may have previously processed the web page to generate the actionable suggestion for the web page, and may have previously indexed the actionable suggestion in association with the URI to enable efficient identification of the actionable suggestion and to avoid having to re-generate the actionable suggestion. Further, the server computing device can also utilize the document information to determine a location in the web page (also referred to herein as "a triggering portion"), for rendering the suggestion. Put another way, the triggering portion can be a location in the web page that corresponds to when the suggestion should be rendered. The suggestion may be, but does not need to be, actually rendered at the location (e.g., the suggestion could instead be rendered in a bottom or top bar of the user interface). For example, the location can be determined based on it corresponding to a location of target content (e.g., a list of ingredients including milk) based on which the suggestion (e.g., "add milk to shopping cart A") is determined. For instance, in the aforementioned working example, the triggering portion can be, for example, in the second section. As another example, the location can be a portion of the document ("a historical portion") and can be determined based on historical interaction data (also referenced herein as "historical user data"), for the web page and/or similar web pages, that indicates when respective users interacted with (e.g., selected) the actionable suggestion (or similar actionable suggestions). For instance, and in view of the aforementioned working example, the fourth section (or a portion thereof) can be determined as the triggering portion, based on the highest quantity of users not selecting the actionable suggestion (or similar actionable suggestions) until when the fourth section was rendered, even if for those users it was rendered before (e.g., those users may have first wanted to judge cooking complexity before adding the ingredients to a shopping list). In this case, the location corresponds to the fourth section.

Regardless of the techniques utilized in determining the actionable suggestion and the aforementioned location, the server can utilize the location and the user interface information in generating a coordinate condition for triggering rendering of the actionable suggestion. The coordinate condition can specify distance(s), e. g., in a vertical and/or horizontal direction, that the interface needs to be scrolled for the triggering condition to be satisfied. For example, the coordinate condition can be "scrolled down 800 pixels" or "scrolled down 12 inches". In generating the coordinate condition based on the location and the user interface information, the server computing device uses the document information to determine, in view of the user interface information, coordinate condition(s) that will be satisfied when the location is rendered in the user interface of the client device. Accordingly, the server computing device will generate different coordinate conditions for differing user interface information. For example, for a 6" vertical by 4" wide user interface the location may be rendered when "scrolled down 500 pixels", whereas for a 4.5" vertical by 3" wide user interface the location may be rendered when "scrolled down 750 pixels". In some implementations, the server computing device can emulate rendering of the web page, with the user interface information, to determine when the location will be rendered on the client device. Optionally, for publicly accessible web pages or other documents, the rendering can be emulated in advance for each of multiple different sets of user interface information to enable pre-determining and pre-storing of corresponding coordinate condition(s) for each. Pre-stored coordinate condition(s) that match (exactly or most closely) to received user interface information can then be selected for the client device. Additional and/or alternative techniques, besides emulating rendering, can be utilized to generate the coordinate condition(s), such as techniques that estimate the coordinate condition(s).

The server computing device provides, to the client device, the coordinate condition(s) in response to the client device transmitting the document information and the user interface information. The server computing device can also provide, to the client device, the actionable suggestion. The client device can use the received coordinate condition(s) to monitor for satisfaction of the coordinate condition(s) within the user interface rendering the web page. For example, coordinate information of the web page at the user interface, can be efficiently monitored to determine when the user has "scrolled down 500 pixels" or satisfied other coordinate condition(s). When satisfaction of the coordinate condition(s) is determined by the client device, the actionable suggestion can be caused to be rendered. Monitoring of the aforementioned coordinate information to determine whether the coordinate condition(s) are satisfied can be efficiently performed by the client device (e.g., via the browser application) using coordinate information that is already available to the client device. Accordingly, more computationally burdensome analysis of the web page need not be performed by the client device, thereby conserving resources of the client device while enabling dynamic triggering of the actionable suggestion. Further, by taking into account the user interface information of the client device, the server computing device is able to generate coordinate conditions that are tailored to the client device, enabling the server computing device to granularly control the client device through provision of the coordinate condition(s).

Continuing with the working example, and turning to the DOM condition, a client device can, in response to accessing the web page (or receiving a request to access the web page), transmit, to a server computing device: document information for the web page. The document information can be, for example, a uniform resource identifier (URI) or other identifier of the web page and/or at least some of the markup language of the web page.

The server computing device can utilize the document information to determine the actionable suggestion for the web page. For example, where the document information includes a URI, the actionable suggestion can be pre-indexed with the URI. Further, the server computing device can also utilize the document information to determine a DOM node, of a DOM of the web page, for rendering the suggestion. For example, the DOM node can be determined based on it corresponding to the target content (i.e., a DOM node in the second section). As another example, the DOM node can be determined based on historical interaction data, for the web page and/or similar web pages, that indicates when respective users interacted with (e.g., selected) the actionable suggestion (or similar actionable suggestions). For instance, the DOM node can be in the fourth section based on the highest quantity of users not selecting the actionable suggestion (or similar actionable suggestions) until when the DOM node was rendered.

The server computing device provides, to the client device, the DOM node in response to the client device transmitting the document information. The server computing device can also provide, to the client device, the actionable suggestion. The client device can use the received DOM node to monitor for active execution, of markup language corresponding to the DOM node, in rendering the document in the user interface. Put another way, the client device can monitor for rendering of content, of the web page, that corresponds to the DOM node. When the client device determines the DOM node is being rendered, the actionable suggestion can be caused to be rendered. Monitoring for rendering of the DOM node can be efficiently performed by the client device (e.g., via the browser application) using coordinate information that is already available to the client device. Accordingly, more computationally burdensome analysis of the web page need not be performed by the client device, thereby conserving resources of the client device while enabling dynamic triggering of the actionable suggestion. Further, the server computing device to granularly control the client device through provision of the DOM node.

Continuing with the working example, and turning to the temporal condition, a historical distribution of selection times can be utilized in generating a temporal condition for the web page and for the client device. The historical distribution of selection times can be generated based on historical selection times, for the actionable suggestion (or similar actionable suggestions) and, optionally, for the web page and/or similar web pages. Each historical selection time can indicate when a respective user interacted with (e.g., selected) the actionable suggestion (or similar actionable suggestion). As an example, the historical distribution of selection times for the web page can have a normal distribution with a median of 20 seconds, 1 standard deviation above of 25 seconds, one standard deviation below of 15 seconds, 2 standard deviations above of 35 seconds, and two standard deviations below of 5 seconds. The historical distribution of selection times can be identified, by the client device or a server device (e.g., based on document information provided by the client device), based on being indexed in association with the web page (or similar web page(s)) and/or with the actionable suggestion (or similar actionable suggestion(s)). Further, the client device or the server device can generate the temporal condition based on the historical distribution (e.g., using the median of the distribution). Yet further, the client device can efficiently monitor for satisfaction of the temporal condition (e.g., by monitoring an amount of time since the web page was loaded), and cause rendering of the actionable suggestion when the temporal condition is satisfied.

In some implementations, in generating a temporal condition based on the historical distribution, stochastic sampling of the historical distribution can optionally be utilized, and the sampled time utilized as the temporal condition. Accordingly, as opposed to always selecting the median (or mean), the selecting can instead be random, but guided by the distribution. For example, with a normal distribution the mean may have a higher probability of being stochastically selected, but will not be selected every time. This can enable the historical distribution to guide the determination of the temporal condition, while still providing variance in the temporal condition. This can enable more meaningful additional data to be generated and used to refine the historical distribution over time. For example, if instead the median was always selected, the historical distribution over time would shift toward greater amounts of time, resulting in late-arrival of corresponding actionable suggestions. Through stochastic sampling these and/or other drawbacks can be mitigated.

In some implementations, in generating a temporal condition based on the historical distribution, the historical distribution is sampled in dependence on a historical measure of selection suggestion by the client device and/or by a user account associated with the access of the web page at the client device. For example, assume a first user account has a historical measure that indicates greater than a first threshold (e.g., 30%) of presented actionable suggestions are selected and a second user account has a historical measure that indicates less than a second threshold (e.g., 5%) of presented actionable suggestions are selected. For the first user account, a two standard deviations below time (e.g., 5 seconds) can be selected from the historical distribution. In contrast, for the second user account a two standard deviations above time (e.g., 35 seconds) can be selected from the historical distribution. For a third user having a historical measure that indicates a selection rate greater than the second threshold but less than the first threshold, a median or mean time can be selected from the historical distribution. Accordingly, the temporal condition, while being guided by the historical distribution, will be selected in dependence on the historical measure of the client device and/or the user account for which the temporal condition is being generated. This can mitigate occurrences of early-arrival and/or late arrival through tailoring of the arrival time in dependence on prior actionable suggestion selection proclivity.

Various implementations disclosed herein can enhance user experience by adaptively triggering suggestions for display that meet user's needs to view additional content or to perform certain action (e.g., third-party action) based on certain content (e.g., target content such as a recipe) she or he encounters while using a content access application (e.g., the aforementioned web browser or browser application) that provides such content. The triggering of suggestions can be adaptive because different triggering condition(s) can apply to trigger the suggestions for a document (public or private) accessed via the content access application. As disclosed herein, while the triggering of suggestions is generally caused by the client computing device (e.g., the aforementioned "client device"), determination of the triggering conditions (e.g., when exactly to trigger the suggestions) can be performed by the client computing device or can be delegated to one or more server computing devices (e.g., the aforementioned "server device") in communication with the client computing device, depending on one or more factors (e.g., whether the document is public and/or resource constraints of the client computing device).

For example, when the document includes private information or is a private document, the determination of the triggering condition(s) can be performed by the client computing device. In this example, the client computing device, to reduce computing resources, can analyze a portion of the document that is displayed in the foreground instead of analyzing the document in its entirety. As another example, when the document is lengthy or complex, the determination of the triggering conditions can be delegated by the client computing device to one or more server computing devices in communication with the client computing device, to save local computing resources of the client computing device, thereby ensuring the efficiency of the client computing device in response to detecting triggering portion (e.g., target content) in the document for triggering suggestion(s) based on the target content.

Some implementations disclosed herein are additionally or alternatively related to detecting a triggering portion in response to which triggering condition(s) apply to trigger one or more suggestions. The triggering portion of the document, in case of a web page providing a recipe, can include target content (e.g., a list of ingredients in the recipe) based on which the suggestion (e.g., actionable suggestion) is determined, and/or a particular portion of the document that is different from the target content and that is determined based on historical user data. Optionally, the particular portion of the document can have a more distant association with the suggestion than the target content based on which the suggestion is determined. For example, the particular portion of the document, the appearance of which at the user interface leading to more than 40% of historical users selecting an actionable suggestion displayed at the user interface along with the particular portion, can be determined as the triggering portion (or determined as one of a plurality of triggering portion that includes the target content).

Like the determination of the triggering condition(s), detecting the triggering portion can be performed by the client computing device or be delegated to one or more server computing devices in communication with the client computing device. For example, when a document provided by the content access application at the client computing device includes private content, the client computing device can detect whether a portion of the document displayed at a user interface of the client computing device includes any target content (or the particular portion), before continuing to determine the one or more triggering conditions for triggering suggestion(s). In various implementations, the client computing device can delegate a task of determining/detecting whether the document includes target content to one or more server computing devices to save computing resources and improve responding efficiencies. In various implementations, the client computing device can determine whether the portion of the document running in the foreground includes target content, but delegate the determination of the triggering conditions to the one or more server computing devices.

In some implementations, whether target content is detected from a portion of the document that is displayed at a user interface of a client computing device can be determined by detecting whether the portion of the document displayed at the user interface of the client computing device includes one or more types of schema markup. As one example, a user of a client computing device (e.g., cell phone or tablet) can open a document (e.g., a web page that shows a recipe, a story about the recipe, advertisement related or unrelated to the recipe, etc.) using a content access application (e.g., web browser or social media). When the document is loaded by the content access application so that a first portion of the document is displayed at a user interface of the client computing device, the client computing device can determine whether any of the aforementioned triggering condition is satisfied (e.g., a coordinate condition in which whether the user interface of the client computing device that shows the first portion of the document includes any target content, such as the recipe, is determined at least based on a location of the target content in the document and the user interface information). In response to determining that one (or more) of the target-content triggering conditions is satisfied, the client computing device can render a suggestion (or more than one suggestion) related to the target content via the user interface of the client computing device.

Optionally, whether the target content is detected from the portion of the document displayed at the user interface of the client computing device can be performed by the client computing device whenever a user of the client computing device loads the document, and/or whenever the user scrolls (e.g., scroll up or scroll down) to navigate through the document.

In some implementations, whether the user interface of the client computing device that shows the first portion of the document includes any target content can be determined by using the client computing device to access schema markup of the first portion of the document (e.g., web page) displayed at the user interface and to determine whether one or more certain types of schema markup (e.g., schema markup for the recipe) is present in a foreground of the client computing device. For example, if the schema markup for the recipe is determined by the client computing device to be present in the foreground, the aforementioned DOM condition can be determined to be satisfied, and in response, a suggestion can be triggered for display at the user interface (e.g., GUI) of the client computing device, or at a different user interface (e.g., audio interface) of the client computing device.

Here, using the client computing device to detect the target content can be advantageous in that instead of the entire document, only a portion (e.g., the first portion) of the document needs to be analyzed to determine whether any target content is displayed in the foreground. The user may scroll to the left so that a second portion of the document is displayed at the user interface of the client computing device, where the second portion is different from the first portion. The client computing device can then access the second portion of the document, instead of the document in its entirety, to determine whether the second portion of the document includes target content to trigger one or more suggestions based on the detection of the target content. In addition, using the client computing device to detect the target content may enable the detection of the target content for documents that are private or are stored locally at the client computing device, without transmitting the documents over one or more networks for processing by a server computing device that is different from the client computing device.

The suggestion can be a selectable element having natural language content that suggests a third-party action performable via a third-party application. For example, the suggestion can be a selectable element displaying "Add product X to app A shopping cart", where "Add product X to app A shopping cart" is a third-party action performable via the third-party application "app A". If the user of the client computing device selects the selectable element, the client computing device can cause the third-party action to be performed via the third-party application. Here, suggestion(s) can be generated preemptively for one or more target content of the document, for example, by a remote server the same as or different from the aforementioned server computing device. For example, the "product X" can be included in the natural language content of the selectable element based on a determination that the "product X" provides, or corresponds to, an ingredient listed in the recipe which is the target content of the web page.

As one example, a user of a client computing device (e.g., desktop) can open a document (e.g., a web page showing a recipe) using a content access application (e.g., web browser). When the document is loaded by the content access application for display at a user interface of the client computing device, the client computing device can transmit to the server computing device the following information: (1) document information of the document including, for example, an address (e.g., URL) of the document to retrieve the document, and/or (2) user interface information of the user interface of the client computing device including, for example, a size (width and/or height) of the user interface (e.g., screen) of the client computing device and/or font (type and size) of content included in the document. The server computing device can determine whether the document include target content using the document information (e.g., by retrieving the web page using the URL address), and if target content is detected, the server computing device can determine, using the document information and the user interface information, coordinate information of the target content in the document displayed at the user interface of the client computing device. It's noted that the coordinate information of the target content in the document displayed at the user interface of the client computing device can vary, depending on for example the screen size ("size of the user interface") of the client computing device.

The coordinate information of the target content can include a first distance from an upper (or lower) edge of the document to the target content (measured by pixels or percentage), and/or a second distance from a side (left or right) edge of the document to the target content (measured by pixels or percentage). The aforementioned coordinate condition can be determined based on the coordinate information of the target content. For example, the server computing device can determine that the coordinate condition is satisfied if the user scrolls down the first distance (and/or scrolls right the second distance), so that the target content is displayed in the foreground of the client computing device. Optionally, in response to the server computing device determining that a user has scrolled through the document to reach the target content based on the coordinate information of the target content so that the coordinate condition is satisfied, the server computing device can generate and transmit a suggestion-triggering signal to the client computing device, so that the client computing device can trigger the suggestion to be rendered at the user interface based on the receiving of the suggestion-triggering signal.

In some implementations, the server computing device can generate a rule of the coordinate condition (i.e., when the coordinate condition is satisfied to trigger a suggestion based on the target content or the aforementioned triggering portion), and transmit the rule of the coordinate condition to the client computing device so that the client computing device can cause the suggestion to be rendered at the user interface of the client computing device when the coordinate condition is determined to be satisfied. Using the server computing device to detect the target content and to generate the rule of the coordinate condition for triggering one or more suggestions based on the target content can save computing resources of the client computing device particularly when the document is lengthy or includes complicated content/features.

Optionally or alternatively, when a document (e.g., a web page) is loaded by the content access application (e.g., browser) for display at a user interface of the client computing device, the client computing device can determine and transmit to the server computing device the document information of the document including, such as an address (e.g., URL) of the document and/or content of the document. Based on the address of the document (e.g., web page), the server computing device may access the document in a tree data structure. For example, the server computing device can access a web page via a Document Object Model (DOM), where content of the web page is arranged using a plurality of nodes forming the tree data structure. In this example, the server computing device can determine whether a target node (e.g., a HTML tag with a specific name or index number) representing target content is displayed at the user interface of the client computing device. When the server computing device determines that the target node representing the target content is displayed at the user interface, the server computing device can generate and transmit a suggestion-triggering signal to the client computing device, so that the client computing device can trigger the suggestion to be rendered at the user interface based on the receiving of the suggestion-triggering signal.

The above is provided merely as an overview of some implementations. Those and/or other implementations are disclosed in more detail herein.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

The above and other aspects, features, and advantages of certain embodiments of the present disclosure will be more apparent from the following description taken in conjunction with the accompanying drawings. In the drawings.

DETAILED DESCRIPTION

The following description with reference to the accompanying drawings is provided for understanding of various implementations of the present disclosure. It's appreciated that different features from different embodiments may be combined with and/or exchanged for one another. In addition, those of ordinary skill in the art will recognize that various changes and modifications of the various embodiments described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

Figure 1A:
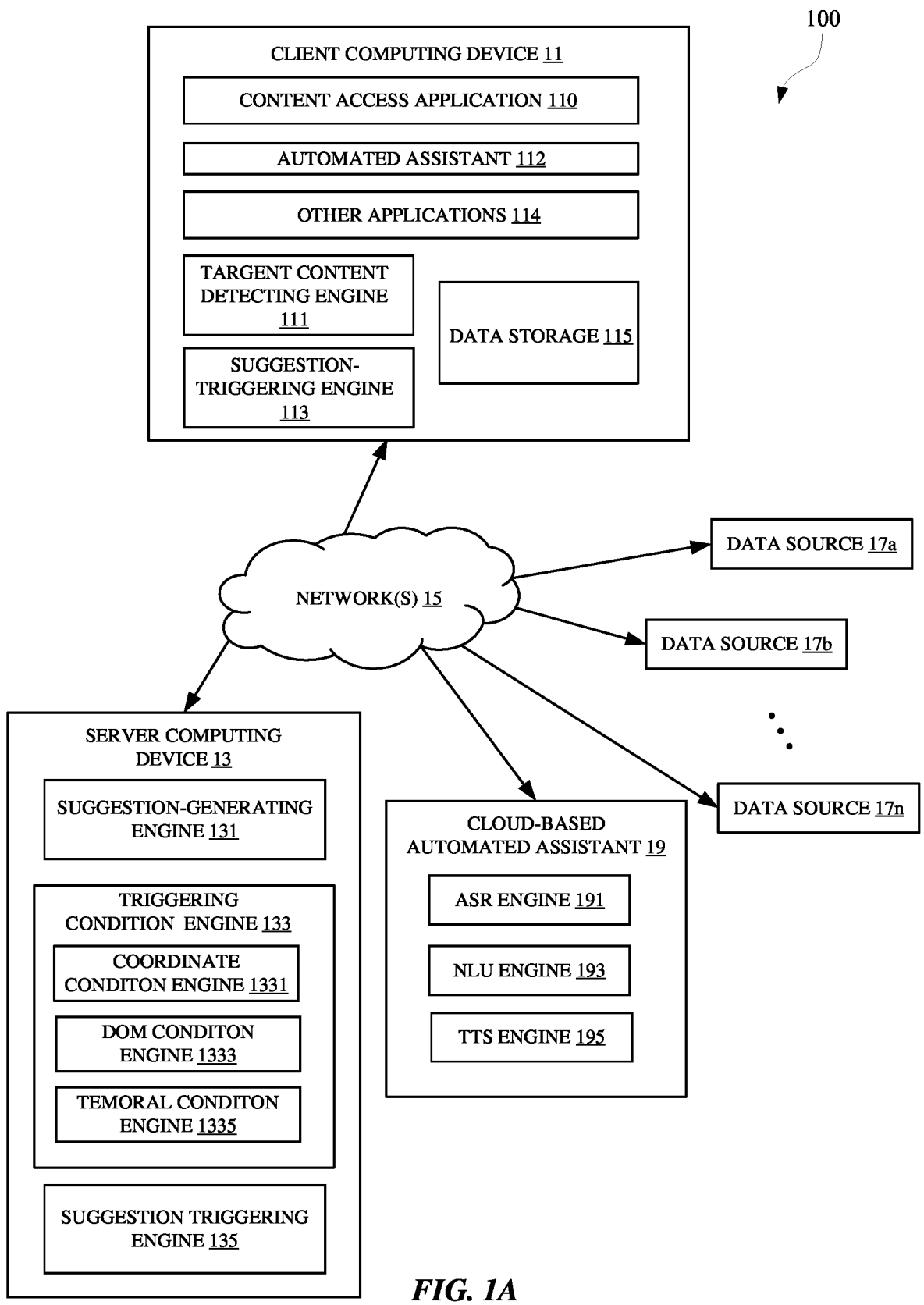
FIG. 1A and FIG. 1B respectively depicts a block diagram of an example environment that demonstrates various aspects of the present disclosure, and in which implementations disclosed herein may be implemented.

FIG. 1A is a block diagram of an example environment that demonstrates various aspects of the present disclosure, and in which implementations disclosed herein may be implemented. As shown in FIG. 1A, the environment can include a client computing device 11, and a server computing device 13 (or other device) in communication with the client computing device 11 via one or more networks 15. The client computing device 11 can be, for example, a cell phone, a laptop, a desktop, a notebook computer, a tablet, a smart TV, a messaging device, or a personal digital assistant (PDA), and the present disclosure is not limited thereto. The server computing device 13 can be, for example, a web server, a proxy server, a VPN server, or any other type of server as needed. The one or more networks 15 can include, for example, a local area network (LAN), a wide area network (WAN) such as the Internet, and/or any other appropriate network.

In some implementations, the server computing device 13 can include a suggestion-generating engine 131 that generates one or more suggestions, based on a document transmitted to the content generation engine 131 for processing. The server computing device 13 can further include a triggering condition determination engine 133 and a suggestion triggering engine 135. The triggering condition determination engine 133 can for example include a coordinate condition engine 1331, a DOM condition engine 1333, a temporal condition engine 1335, and/or other condition engine(s) 1337 (e.g., attention-tracking condition engine).

The coordinate condition engine 1331 can, for example, determine whether a document includes a triggering portion, where the detection of the triggering portion in the document triggers a suggestion (e.g., actionable suggestion). The triggering portion can be target content of the document, where the target content is processed to generate the suggestion. Alternatively or additionally, the triggering portion can be a particular portion of the document that is different from (e.g., subsequent to) the target content and that is optionally determined based on historical user data associated with the document. For example, the particular portion of the document can be determined as the triggering portion, based on the historical user data indicating that when the particular content of the document is displayed at a particular location of the user interface of the client computing device 11, a quantity (or a percentage) of historical users selecting a suggestion (generated based on the document or the target content of the document) exceeds a threshold (being either a quantity threshold or percentage threshold). The coordinate condition engine 1331 can further determine a location of the triggering portion in the document, and/or a location of the triggering portion at the user interface of the client computing device 11. The location of the triggering portion at the user interface can be determined, for example, using the document and user interface information of the user interface that can include dimensions of the user interface, default font size/type for the user interface, and/or other information related to the user interface.

Optionally, based on the location of the triggering portion at the user interface of the client computing device 11 and the user interface, the coordinate condition engine 1331 can determine whether a triggering condition (e.g., a coordinate condition in this case) is satisfied. If the coordinate condition is determined to be satisfied, the suggestion triggering engine 135 can trigger a suggestion to be rendered at the user interface, as an overlay of the document in close proximity (e.g., adjacent to the triggering portion) to the triggering portion, at a top bar of the user interface, at a bottom bar of the user interface, or at other areas of the user interface. Optionally, the location to render the suggestion in the document can be determined based on historical user data indicating historical locations for one or more suggestions historically rendered for user interaction. For example, the historical location of a suggestion in (or over) the document having a highest frequency of user selection can be determined as the location of the suggestion. The present disclosure is not intended to limit a location where the suggestion is to be rendered. In some implementations, the coordinate condition engine 1331 can determine that the coordinate condition is satisfied by processing the user interface and detecting, based on the processing, a location of a scrollbar indicating that a user has scrolled down, for example, 800 pixels, 12 inches, or 30% of the document, which is within a range for the triggering portion to be displayed at the user interface.

As a non-limiting example, the coordinate condition engine 1331 can process the document, i.e., a web page, to determine that the web page includes a list of ingredients as target content, the appearance of which at the user interface can trigger the rendering of a suggestion ("add the list of ingredients to my shopping list in app A") at the user interface, and/or a location of the target content in the document. In some implementations, the coordinate condition engine 1331 can further determine, based on user interface information of the user interface of the client computing device 11 (e.g., dimensions of the user interface and default font for the document when displayed at the user interface), a location of the target content with respect to the user interface (e.g., whether the user interface displays the target content, or a distance or percentage a user needs to scroll down to see the target content). When the coordinate condition engine 1331 determines that the user has scrolls down, for example, 500 pixels, which is between a range of 400-600 pixels where an entirely (or a desired portion) of the target content is displayed at the user interface, the coordinate condition engine 1331 can determine that the coordinate condition is satisfied. In response to the coordinate condition engine 1331 determining that the coordinate condition is satisfied, the suggestion triggering engine 135 can trigger a suggestion to be rendered at the user interface, where the suggestion can be an actionable suggestion that suggests a first-party action (i.e., automated assistant action) performable by an automated assistant or a third-party action performable by a third-party action (e.g., calendar application, shopping app).

The DOM condition engine 1333 can, for example, access a DOM tree structure (may also be referred to simply as "DOM") of the document having a plurality of DOM nodes, and detect whether the plurality of DOM nodes includes a triggering node for triggering a suggestion. In some implementations, the triggering node can be determined based on content of the document. For example, the triggering node can be a target node that corresponds to the target content of the document, or can be a node of interest that is determined based on the historical user data and that corresponds to the aforementioned particular portion of the document. Detecting whether the plurality of DOM nodes includes a target node can be realized by determining whether markup language of the document includes a target tag (or a tag of interest such as a HTML tag with a specific name or index number). If the markup language is determined to include the target tag, the DOM condition engine 1333 can further determine whether the target content (or the particular portion of the document) to which the target node (or the tag of interest) corresponds is being rendered at the user interface of the client computing device. When the DOM condition engine 1333 detects that a triggering node (the target node or the node of interest) is running foreground at the user interface of the client computing device (i.e., the triggering portion is being rendered at the user interface), the DOM condition engine 1333 can determine that the DOM condition is satisfied.

Alternatively or additionally, the DOM condition engine 1333 can determine whether the plurality of DOM nodes includes a triggering node (also "triggering DOM node") based on historical user data indicating, for example, a suggestion that was most frequently selected by historical user when the triggering node is rendered in the foreground). The present disclosure is not limited thereto.

In response to the DOM condition engine 1331 determining that the DOM condition is satisfied, the suggestion triggering engine 135 can trigger a suggestion to be rendered at the user interface, where the suggestion can be an actionable suggestion determined using the target content (but not necessarily using the particular portion of the document).

The temporal condition engine 1333 can, for example, access the historical user data for a historical distribution of selection times it takes for historical users/readers of the document to select a suggestion. The temporal condition engine 1333 can select, for example, a mean or medium time it takes for the historical users/readers of the document to select a suggestion, as the temporal condition to trigger a suggestion. In this case, if it's detected that a user of the document has opened the document at the user interface (currently running foreground of the client computing device 11) for a period of time exceeding the mean (or medium) time determined from the historical user data, the temporal condition engine 1333 can determine that the temporal condition is satisfied, and in response, cause the suggestion triggering engine 135 to trigger the rendering of a suggestion at the user interface.

In some implementations, the triggering condition engine 133 can be accessed at the server computing device 13. In some other implementations, the triggering condition engine 133 can be accessed at the client computing device 11. In some other implementations, the triggering condition engine 133 can be accessed at both the client computing device 11 and the server computing device 13. In some other implementations, the triggering condition engine 133 can be partly (e.g., with the temporal condition engine 1335) accessed at the client computing device 11, and partly (e.g., with the coordinate condition engine 1331 and the DOM engine 1333) accessed at the server computing device 13, and the present disclosure is not limited thereto. In some other implementations, the coordinate condition engine 1331 or a portion thereof can be accessed at the client computing device 11 (and or the server computing device 13). The DOM condition engine 1333 or a portion thereof can be accessed at the client computing device 11 (and or the server computing device 13). The temporal condition engine 1335 or a portion thereof can be accessed at the client computing device 11 (and or the server computing device 13).

In various implementations, the client computing device 11 can be installed with, or otherwise access, a content access application 110. The content access application 110 can access content or data (e.g., a document) stored at data source such as data sources 17a, 17b, through 17n, via the one or more networks 15. Optionally or additionally, the content access application 110 can access content or data from a data storage 115 of the client computing device 11. As a non-limiting example, the content access application 110 can be a web browser that retrieves one or more web pages from one or more of the aforementioned data sources, and that displays the one or more web pages to a user of the client computing device 11. The web browser can be a standalone web browser, or an in-app web browser that is a web-enabled component of a larger application, and the present disclosure is not limited thereto. After being launched at the client computing device 11, the web browser can allow the user to access a web page that is of interest to the user, by performing a search of web pages using keyword(s) and selecting the web page from one or more web pages listed as search results, or by entering a Uniform Resource Locator (URL) address of the web page that is of interest at a search bar of the web browser.

Optionally or additionally, the web browser can allow the user to access a third-party application such as email via, for example, a hyperlink of the web page displayed by the web browser or the aforementioned suggestion. In some implementations, instead of a web browser, the content access application 110 can be, for example, a reader application (or other applications) that can access and display a document (e.g., e-book, PDF, word document, etc.) stored locally in the data storage 115 or remotely at data sources such as data source 17a. Optionally, the document can be a private document, and the client computing device 11 (or the server computing device 13) can process a portion or entirety of the document, for example, with permission or authorization.

In various implementations, the client computing device 11 can include a target content detecting engine 111 that detects whether content of a user interface of the client computing device 11 includes target content, such as target natural language content or a target image. As a non-limiting example, the content access application 110 can run foreground and open a document, such as a web page, for display via the user interface of the client computing device 11, and the target content detecting engine 111 of the client computing device 11 can detect whether the user interface of the client computing device 11 that displays a portion of the document (in case the document is lengthy) includes target content, such as a recipe the user is interested in. In some implementations, the target content detecting engine 111 can parse the portion of the document displayed at the user interface of the client computing device 11 to detect the target content.

As a non-limiting example, for a portion of a web page displayed by a web browser at the user interface of the client computing device 11, the target content detecting engine 111 can access a document object model (DOM) of the web page, where the DOM displays a HTML file of the web page as a structured data tree having a plurality of nodes. The plurality of nodes in the structured data tree can include: a root node, one or more element nodes, one or more text nodes, and one or more attribute nodes. In this example, the target content detecting engine 111 can determine whether the plurality of nodes includes a target node representing target content. As another non-limiting example, the target content detecting engine 111 may detect the target content by determining whether certain schema markup is present for the portion of the document (e.g., web page) displayed foreground at the client computing device 11.

In some implementations, the target content detecting engine 111 can be configured to detect whether target content is present at the foreground of the client computing device 11, whenever content displays at the user interface of the client computing device 11 varies or whenever new content is displayed at the user interface of the client computing device 11. For example, the target content detecting engine 111 can detect whether the portion of the document displayed at the user interface of the client computing device 11 includes target content in response to the document being loaded at the content access application 110. As another non-limiting example, the target content detecting engine 111 can detect whether the portion of the document displayed at the user interface of the client computing device 11 includes target content in response to a user of the client computing device 11 scrolling down the document (e.g., web page) displayed at the user interface of the client computing device 11. As a further non-limiting example, the target content detecting engine 111 can detect whether the portion of the document displayed at the user interface of the client computing device 11 includes target content in response to a user of the client computing device 11 scrolling up the document (e.g., web page) displayed at the user interface of the client computing device 11.

Optionally, the target content detecting engine 111 can be included in the content access application 110 or otherwise accessible by the content access application 110. Optionally, when the aforementioned coordinate condition engine 1331 (or the DOM engine 1333) is accessed at the client computing device 11, the target content detecting engine 111 can be part of the coordinate condition engine 1331 (or the DOM engine 1333). Optionally or additionally, the target content detecting engine 111 can have a cloud-based counterpart accessible at the server computing device 13.

In various implementations, the client computing device 11 can include a suggestion-triggering engine 113 (the same as or different from the aforementioned suggestion triggering engine 135) that determines when to trigger the suggestion for rendering to a user. In some implementations, the suggestion-triggering engine 113 can determine whether one or more triggering conditions are met/satisfied (or otherwise monitor when any of the one or more triggering conditions is met/satisfied), and if one of the one or more triggering conditions is met, the suggestion-triggering engine 113 can trigger the suggestion to be rendered. The one or more triggering conditions can include, for example, an attention-tracking condition indicating whether a minimum period required to show a user's attention has passed since the most recent user scrolling input (e.g., the last time user scrolls a scrollbar) and/or whether the user has attempted to copy and paste phrase(s) from the document since the document is loaded by the content access application 110. In this example, the minimum period can optionally be determined based on the aforementioned historical user data that provides a distribution of time it takes for historical users of the content access application 110 (or the client computing device 11) to select a suggestion after the document is loaded by the content access application 110. Alternatively or additionally, the minimum period can be determined based on other approaches, such as a research study disclosing a time period needed to show a user's interest when reading a document. The attention-tracking condition can be determined (for example, by the aforementioned attention-tracking condition engine) to be satisfied, for example, when it's detected that the user has stopped scrolling the scrollbar for the minimum period. The attention-tracking condition can also be determined to be satisfied, for example, when it's detected that the user has selected one or more phrases from the document for copy & paste, for highlight, or for comment.

As another example, the one or more triggering conditions can include a target content coordinate condition. The target content coordinate condition can be part of the aforementioned coordinate condition and can indicate whether the target content is displayed in the foreground of the client computing device 11 using coordinate information of the target content in the document. In this example, the coordinate information of the target content can include a first distance measured by pixels (or inches) from the target content to an upper edge of the document. Alternatively or additionally, the coordinate information of the target content can include a second distance measured by pixels from a left (or right) edge of the document to the target content. Alternatively, the coordinate information can include a percentage that a user needs to scroll to reach the target content. It's noted that depending on the client computing device 11 and/or the content access application 110, the coordinate information of the target content of the document displayed via a user interface of the client computing device 11 can vary. As a result, when the suggestion-triggering engine 113 is included in the server computing device 13 to detect the one or more triggering conditions of the suggestion, the client computing device 11 may need to transmit user interface information such as a width, height, and/or font size of the user interface of the client computing device 11 to the server computing device 13.

In various implementations, the client computing device 11 can further include an automated assistant 112, referring to an interactive software application (also referred to as "chatbots," "interactive personal assistants," "intelligent personal assistants," "personal voice assistants," "conversational agents," etc.). The client computing device 11 may generate or otherwise retrieve a suggestion that is based on the target content, using (or not using) the automated assistant 112. For example, the client computing device 11 may retrieve one or more suggestions from the server computing device 13. As another example, the suggestion may be a suggestion for an action (e.g., third-party action) performable via a third-party application (e.g., "add milk to shopping cart A"), and the client computing device 11 may rely on the automated assistant 112 to perform one or more preemptive tasks. The one or more preemptive tasks can include but are not limited to: determining whether the third-party application is installed or otherwise accessible by the client computing device 11, determining whether a user of the client computing device 11 has an account for the third-party application, and/or determining whether the user of the client computing device 11 is logged into the account of the third-party application.

Optionally, the suggestion can also be a suggestion of additional content different but derived from the target content, such as a link to a website showing an alternative recipe Optionally, the target content detecting engine 111 can be included in the automated assistant 112 or otherwise accessible by the automated assistant 112.

In various implementations, the client computing device 11 can cause the suggestion (or one of the one or more suggestions) to be rendered at the user interface of the client computing device 11 that displays the portion of the document that includes target content.

Such suggestion(s) can be selectable. For example, the user can click (using keyboard, finger touch, or gesture) on a suggestion to select the suggestion. As another example, the user can select the suggestion by providing an audio input via a microphone. The user may (or may) not interact/select the suggestion using the automated assistant 112. As a non-limiting example, the user can audibly select a suggestion, such as "add milk to your app A shopping cart", by providing a spoken utterance "yes please". In this example, the spoken utterance can be processed by the automated assistant 112 so that a third-party action is performed (e.g., milk is added to app A shopping cart). Optionally, the user can audibly select a suggestion, such as "copy the list of ingredients to my note-taking application", so that a first-party action (i.e., in this case, "copy the list of ingredients") is performed by the automated assistant 112.

As another non-limiting example, the user can audibly select a suggestion, such as "see substitutions for milk", by providing a spoken utterance "yes please". In this example, the spoken utterance (e.g., "yes please") can be processed by the automated assistant 112 to confirm that the user wants to see substitutions for milk, so that the automated assistant 112 can perform a search and additional content (e.g., one or more substitutions to replace milk in the recipe displayed by a web page) based on a result of the search is rendered to the user.

One or more components of the automated assistant 112 will be introduced later in this disclosure with reference to descriptions of a cloud-based automated assistant 19. Optionally or alternatively, referring to FIG. 1B, the content access application 110 can include an automated assistant component 1101 (may also be referred to as "automated assistant functionality"), e.g., to cause a change to an interface of the content access application 110 in response to receiving a voice input (maybe referred to as "voice command") from the user. Optionally, referring to FIGS. 1A and 1B, the client computing device 11 can include other application(s) 114. The other application(s) 114 can include, for example, the aforementioned third-party application which can be a shopping app A or any other application when appropriate.

Optionally, the client computing device 11 can cause the suggestion to be rendered at a top bar of the user interface of the client computing device 11, or a top bar of an interface of the content access application 110 (which can be part of the user interface of the client computing device 11). Optionally, the client computing device 11 can cause the suggestion to be rendered at a bottom bar of the user interface of the client computing device 11, or a bottom bar of the interface of the content access application 110. Optionally, the client computing device 11 can cause the suggestion to be rendered as an overlay (e.g., HTML overlay) over the user interface of the client computing device 11, or as an overlay over the interface of the content access application 110. As a non-limiting example, the overlay can be positioned based on a location of the target content displayed at the user interface of the client computing device 11.

Optionally, after receiving a voice command or spoken utterance from the user that selects the suggestion suggesting a third-party action, i.e., "add milk to shopping app A", the suggestion can disappear from the user interface of the client computing device 11. Optionally, in response to the suggestion suggesting "add milk to shopping app A" disappears after user selection, a notification, such as a message in the form of text, graphic, or audio, and/or a symbol, indicating that milk has been added to a shopping cart of the shopping app A can be rendered to the user via the user interface. Optionally, after the suggestion suggesting "add milk to shopping app A" is rendered and selected, the shopping app A (third-party application) may determine that one or more parameters of the third-party action (i.e., add milk to shopping app A), such as a quantity and/or a brand of the milk to be added to the shopping cart, are missing. In this case, a selectable element can be rendered to the user at the user interface for additional user input that fulfills the third-party action of adding a certain quantity (e.g., half gallon) of milk from a certain brand to the shopping cart of the shopping app A.

Figure 1B:
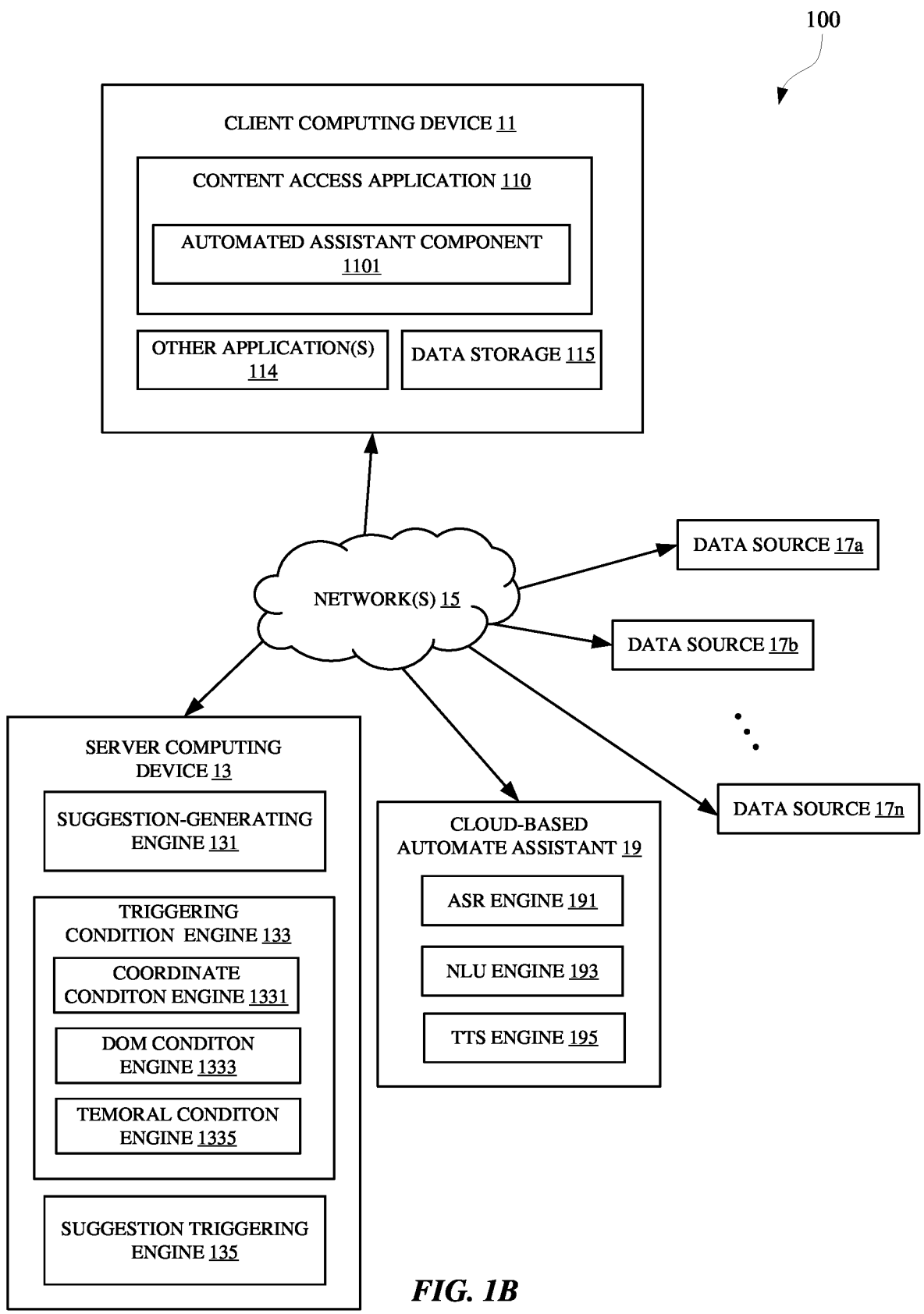

The automated assistant 112 in FIG. 1A, or the automated assistant component 1101 in FIG. 1B, for example, can be in communication with a cloud-based counterpart, i.e., the cloud-based automated assistant 19 that offers service in a cloud computing environment. In this case, the aforementioned environment becomes a cloud computing environment in which a plurality of computing devices, which can be in the order of hundreds or thousands or more, share resources over the one or more networks 15. In some implementations, the cloud-based automated assistant 19 can be installed at or otherwise accessed by the server computing device 13 to perform one or more actions the server computing device 13 is described to perform in this disclosure.

The cloud-based automated assistant 19 can include, for example, an automatic speech recognition (ASR) engine 191, a natural language understanding (NLU) engine 193, and a text-to-speech (TTS) engine 195. The ASR engine 191 can process audio data that captures a spoken utterance to generate a recognition of the spoken utterance. The NLU engine 193 can determine semantic meaning(s) of audio and/or text converted by the ASR engine from audio, and decompose the determined semantic meaning(s) to determine intent(s) and/or parameter(s) for an assistant action. For example, the NLU engine 193 can determine an intent and/or parameters for an assistant action based on the aforementioned recognition of the spoken utterance generated by the ASR engine 191.

In some implementations, the NLU engine 193 can resolve the intent(s) and/or parameter(s) based on a single utterance of a user and, in other situations, prompts can be generated based on unresolved intent(s) and/or parameter(s), those prompts rendered to the user, and user response(s) to those prompt(s) utilized by the NLU engine 193 in resolving intent(s) and/or parameter(s). In those situations, the NLU engine 193 can optionally work in concert with a dialog manager engine (not illustrated) that determines unresolved intent(s) and/or parameter(s) and/or generates corresponding prompt(s). The NLU engine 193 can utilize one or more NLU machine learning models in determining intent(s) and/or parameter(s).

The TTS engine 195 can convert text to synthesized speech, and can rely on one or more speech synthesis neural network models in doing so. The TTS engine 195 can be utilized, for example, to convert a textual response into audio data that includes a synthesized version of the text, and the synthesized version can be audibly rendered via hardware speaker(s) of the client computing device 11 or another device.

As mentioned above, the client computing device 11 can include other application(s) 112. For example, the other application(s) 112 can include a social media application, a media player, and/or the third-party application such as the shopping app A or the note-taking application, that is installed at the client computing device 11.

In various implementations, the server computing device 13 can receive, from the client computing device 11, document information of a document that is launched or at least partially displayed at a user interface of the client computing device 11. The server computing device 13 can determine, based on the document information, whether a portion of the document displayed at the user interface of the client computing device 11 includes triggering portion (e.g., target content). When it's determined that the portion of the document displayed at the user interface of the client computing device 11 includes the triggering portion, the server computing device 13 can further determine, based on the document information and based on user interface information, coordinate information of the triggering portion in the document at the user interface, where at least a portion of the document (not necessarily including the triggering portion) is rendered/displayed at the user interface of the client computing device 11.

It's noted that as mentioned above, the client computing device 11 can determine that the portion of the document displayed at the user interface of the client computing device 11 includes the triggering portion. In this case, the client computing device 11 can notify the server computing device 13 by sending a notification message or transmitting an indication signal indicating that the portion of the document displayed at the user interface of the client computing device 11 includes the triggering portion, and the server computing device 13 may or may not need to detect whether a rest of the document include additional triggering portion. Optionally, the client computing device 11 can determine that the portion of the document displayed at the user interface of the client computing device 11 includes no triggering portion. In this case, the server computing device 13 can detect whether a rest of the document includes triggering portion, for example, by accessing markup language or DOM of the document in its entirety.

The aforementioned document information can include, for example, an address (e.g., URI, URL or a local path) of the document (e.g., web page), so that the server computing device 13 can access the document, and/or index the document. For example, the server computing device 13 can access a web page using the URL address of the web page, and index the web page using a raw HTML of the web page and/or metadata extracted from the web page. The user interface information can at least include, for example, a width of the user interface of the client computing device 11, a height of the user interface of the client computing device 11, and/or a font size of the document displayed at the user interface of the client computing device 11.

In some implementations, the server computing device 13 can, for example, include the aforementioned target content detecting engine 111, to access a document object model (DOM) of a document (e.g., a web page) in its entirety, where the DOM displays the document using a structured data tree having a plurality of nodes. The plurality of nodes in the structured data tree can include: a root node, one or more element nodes, one or more text nodes, and one or more attribute nodes. In this example, the server computing device 13 can determine whether the plurality of nodes includes a target node representing target content, to detect whether the document includes any target content. If the server computing device 13 determines that the plurality of nodes includes a target node representing target content, the server computing device 13 can determine that the document includes target content.

As mentioned above, the server computing device 13 can determine, based on the document information and based on the user interface information, the coordinate information of the target content in the document rendered or to be rendered at the user interface of the client computing device 11. For example, the server computing device 13 can determine a distance from the target content to an upper edge of the document and/or a length of the document from the upper edge to a bottom edge of the document, and then calculate a percentage for the user to scroll down (or up) to see the target content if the target content is not displayed when the document is loaded via the content access application 110. In some cases, the server computing device 13 can optionally or additionally determine a distance from the target content to a left edge of the document and/or a width of the document from the left edge to a right edge of the document. Based on the distance from the target content to the left edge of the document and the width of the document, the server computing device 13 can determine an additional percentage that the user needs to scroll to the right (or left) to see the target content.

Optionally, the server computing device 13 can determine a first range of percentages within which the user can scroll up or down to see at least a portion of the target content. Optionally, the server computing device 13 can determine a second range of percentages within which the user can scroll left or right to see at least a portion of the target content.

In various implementations, the server computing device 13 (or sometimes the client computing device 11) can determine, based on at least the coordinate information of the target content (or based on whether the target content coordinate condition, being part of the coordinate condition, is satisfied), whether and/or when to trigger a suggestion (e.g., the aforementioned first-party action or third-party action) related to the target content (or other triggering portion). For example, when the server computing device 13 detects no coordinate information of the triggering portion (indicating that a document includes no triggering portion), the server computing device 13 can determine that a suggestion does not need to be triggered.

As another example, when the coordinate information of the target content indicates that a user will need to scroll down a first percentage, e.g., approximately 35% of a document rendered at the user interface of the client computing device 11, to see the target content of the document, the server computing device 13 can trigger a suggestion which can be generated based on the target content, in response to the user scrolling down approximately 35% (or within a range of approximately 33%~37%) of the document. Optionally or additionally, the server computing device 13 (or sometimes the client computing device 11) can determine whether and/or when to trigger a suggestion related to the target content based on historical usage data of the document, in addition to whether the target content coordinate condition is satisfied. For example, the historical usage data can include a click-through rate of the suggestion, and when the click-through rate exceeds a threshold (or a predetermined rate), the suggestion can be triggered or rendered in response to the user scrolling down, for example, approximately 35% of the document in the previous example. When the click-through rate does not exceed the threshold, the suggestion will not be triggered (or rendered) in response to the user scrolling down, for example, approximately 35% of the document.

Alternatively or additionally, the server computing device 13 (or the client computing device 11) can access historical user data, such as a time period from a document being loaded to a user interacting with (e.g., clicking on) a suggestion, for one or more users that accesses the document, and/or a distribution of the time period ("historical distribution of selection times" or "historical statistical distribution of selection times") generated using the time period collected for the one or more users. The server computing device 13 (or the client computing device 11) can determine, based on the time periods for the one or more users (or the historical distribution of selection times), when to trigger the suggestion. For example, when the historical user data indicates that, on average, historical users of a document spend approximately 2 min to read the document before interacting with (e.g., clicking on) a suggestion related to target content of the document, the server computing device 13 (or the client computing device 11) can trigger the suggestion to be rendered approximately 2 min after the document is loaded or opened by the content access application 110 at the user interface of the client computing device 11.

As another example, when the historical user data indicates that 90% of historical users of a document spend approximately 50 seconds to 80 seconds to read the document before clicking on a suggestion related to target content of the document, the server computing device 13 (or the client computing device 11) can trigger the suggestion to be rendered approximately 50 seconds after the document is loaded or opened by the content access application 110 at the user interface of the client computing device 11. Such rendering can end when it is approximately 80 seconds after the document is loaded or opened by the content access application 110. The suggestion can be determined/generated, for example, using factors such as device type of the client computing device 11, a type of the third-party application to perform a third-party action suggested by the suggestion, a device location of the client computing device 11 or a third-party device to perform the third-party action, and/or a user location of the user of the client computing device 11.

Alternatively, the server computing device 13 (or the client computing device 11) can determine when to trigger a suggestion based on a location of the target content detected in the document displayed at the user interface of the client computing device 11 by parsing content of the document, such as HTML content for a web page, to predict a minimum browsing time for a user to reach the target content. For example, the server computing device 13, or the client computing device 11, can parse the HTML content of a web page and predicts, statistically or using one or more models, that a user needs a minimum browsing time of approximately 45 seconds to reach the target content. In this example, the server computing device 13, or the client computing device 11, can cause a suggestion related to the target content approximately 45 seconds after the web page is loaded or opened at the client computing device 11.

Alternatively, the server computing device 13 (or the client computing device 11) can monitor one or more user actions, such as whether a user has stopped scrolling a document for more than a predetermined time period. If the user has stopped scrolling the document for more than the predetermined time period (e.g., 15 seconds), the server computing device 13 (or the client computing device 11) can determine that the portion of the document currently displayed at the user interface of the client computing device 11 includes content of interest to the user. In this case, the server computing device 13 (or the client computing device 11) can cause a suggestion to be rendered in response to a time period of the user in stopping scrolling the document meeting or exceeding the predetermined time period. The suggestion here can be generated based on the target content or the content of interest to the user.

Figure 2A:
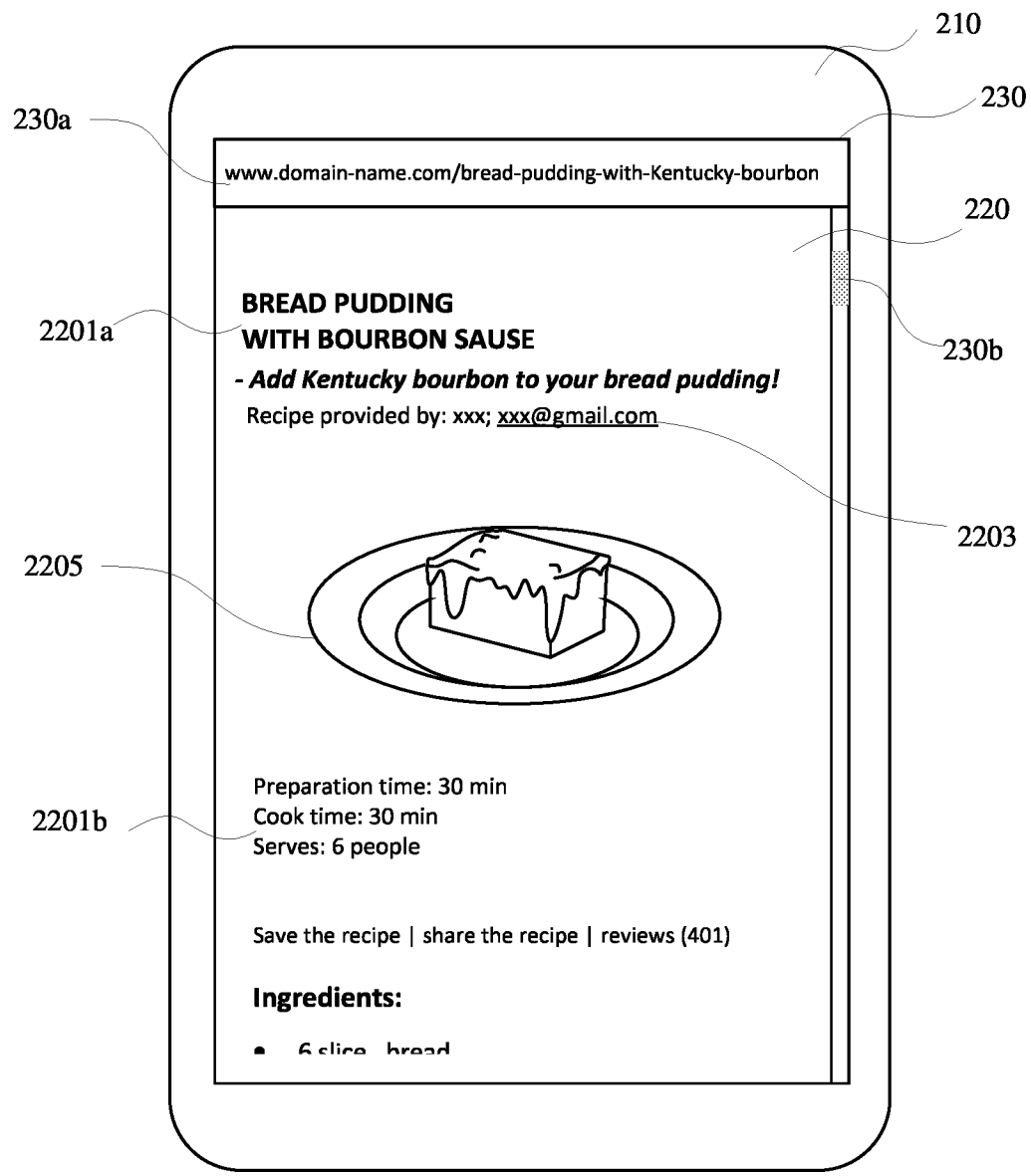
FIG. 2A depicts an example user interface of FIG. 1A or FIG. 1B, in accordance with various implementations.

FIGS. 2A, 2B, 2C, 2D, and 2E depict non-limiting examples of user interfaces of FIG. 1A (or FIG. 1B), in accordance with various implementations. FIG. 2A shows a user interface 230 of the client computing device 210, where the client computing device 210 can open a content access application, such as a web browser, in response to a user of the client computing device 210 selecting (e.g., clicking on) an icon displayed at an interface of the client computing device 210 that represents the web browser. As a non-limiting example shown in FIG. 2A, the user can use the web browser to search for a recipe using keywords such as "Kentucky bread pudding with bourbon", and select to open, from a list of web pages (not shown) returned as search results by a search engine of the web browser, a web page 220 with a URL address of "www.domain-name.com/bread-pudding-with-kentucky-bourbon", which is at least partially shown at a URL field 230a of the user interface 230 of the client computing device 210.

In this example, the user interface 230 may show only a portion of the web page 220, and the user may need to use one or more scrollbars 230b to view different portion(s) of the web page 220. The one or more scrollbars 230b can include, for example, a vertical scrollbar that allows the user to scroll up or scroll down the web page 220, and/or a horizontal scrollbar that allows the user to scroll left or scroll right the web page 220, thereby allowing the user to read the web page 220 in its entirety.

In this example, the web page 220 showing a recipe for "Kentucky bread pudding with bourbon" can include one or more text portions such as a first text portion 2201a and a second text portion 2201b, and one or more multimedia content portions such as an image portion 2205 showing an image of a ready-to-serve "Kentucky bread pudding with bourbon". In this case, the first text portion 2201a can include a title (e.g., "BREAD PUDDING WITH BOURBON SAUCE" in FIG. 2A) of the web page 220, a subtitle (e.g., "Add Kentucky bourbon to your bread pudding!" in FIG. 2A) of the web page 220, and/or information (e.g., name and contact information) of a recipe provider, where the information of the recipe provider can include contact information in a hyperlink that leads to the access of an email application (e.g., Gmail). The user interface 230 of the client computing device 210, limited by its dimensions of the user interface 230 that can be dependent on a type of the client computing device 210, may display only a portion of the second text portion 2201b (e.g., preparation time: 30 min . . . save the recipe | share the recipe . . . Ingredients), and in case of the scenario shown in FIG. 2A, the user may need to scroll down the scrollbar 230b to read specific ingredients needed to prepare the "Kentucky bread pudding with bourbon".

In this example, the client computing device 210 can detect whether the portion of the web page 220 shown via a user interface 230 of the client computing device 210, i.e., a portion of the web page 220 shown on a foreground screen of the client computing device 210, includes triggering portion for triggering a suggestion. The triggering portion can be target content such as recipe content or ingredient content. Alternatively or additionally, the triggering portion can be other content (e.g., a cooking instructions section as indicated in FIG. 2B, or a conclusion/summary section at the end of the web page 220, not shown in the figures) determined based on historical user data of the web page 220 indicating that historical users of the web page 220 tend (e.g., 50% of the historical users) to select a suggestion when the other content is rendered for browsing by the historical users.

The detection of the triggering portion can be implemented by the client computing device 210 by detecting, for example, a certain type of schema markup (e.g., a HTML tag) representing the target content or the other content determined based on the historical user data. Optionally, it's noted that instead of the client computing device 210 detecting a portion of the web page 220, a server computing device (such as the server computing device 13 in FIG. 1B) can access the web page 220 in its entirety and determine whether the web page 220 includes any triggering portion. This can be implemented, for example, by using the server computing device to access the DOM of the web page 220 and detect whether the DOM of the web page 220 includes a target node that presents the target content (or a node of interest that represents the other content).

Referring to FIG. 2A, the client computing device 210, after processing the portion of the web page 220 shown at the user interface 230 of the client computing device 210, may detect no triggering portion because no target content (e.g., specific ingredient) is listed (or identified) at the user interface 230 and/or because no other content determined from the historical user data is present at the user interface 230. In this case, the client computing device 210 generates no suggestion (or selectable element) to be rendered at the user interface 230, because no triggering portion is detected.

Figure 2B:
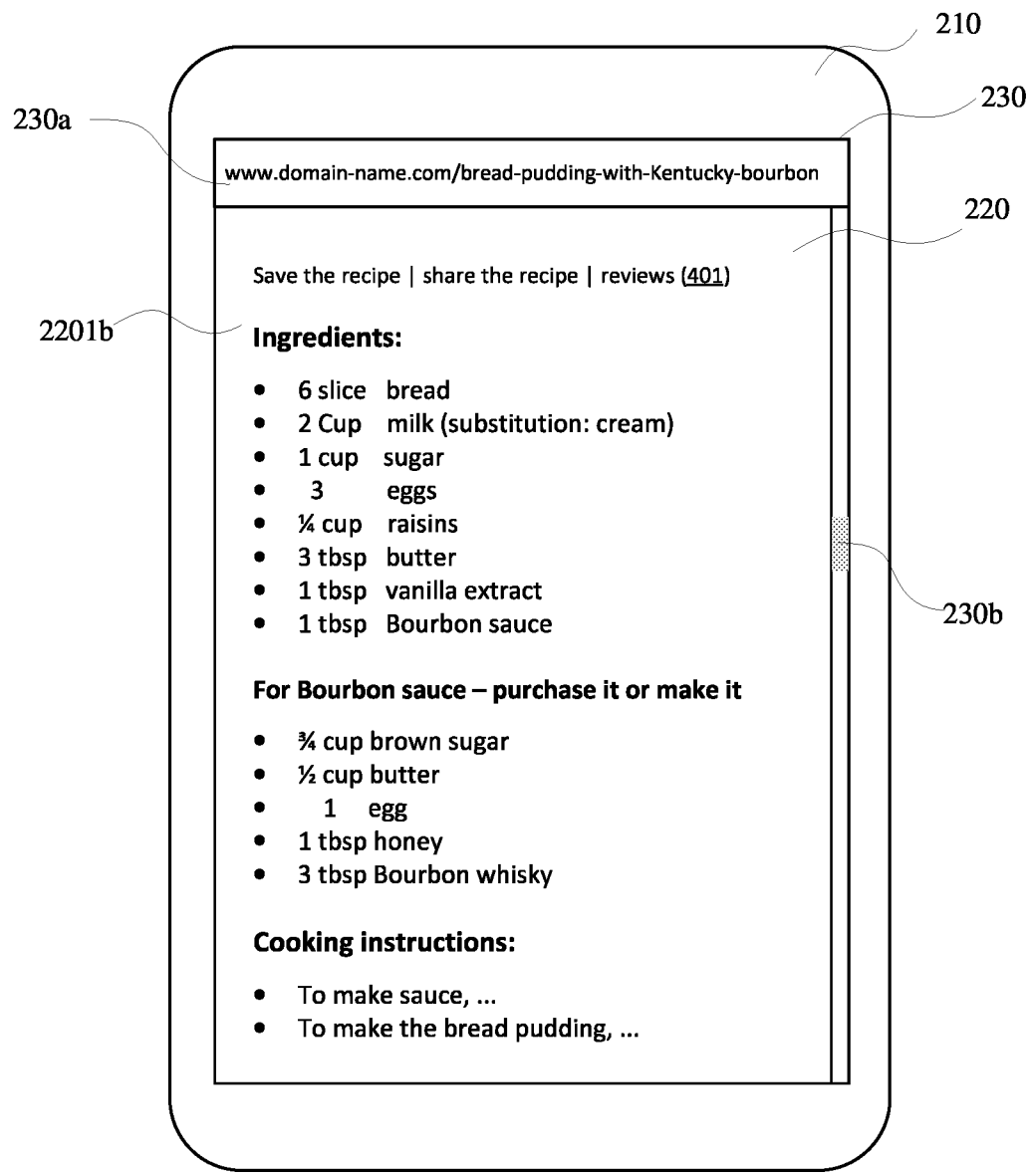
FIG. 2B depicts another example user interface of FIG. 1A or FIG. 1B, in accordance with various implementations.

Referring to FIG. 2B, after the user scrolls down the scrollbar 230b, a different portion of the web page 220 is displayed via the user interface 230 of the client computing device 210. In this situation, the client computing device can detect that the different portion of the web page 220 currently displayed at the user interface 230 includes the triggering portion, e.g., target content (e.g., "6 slice bread . . . 1 tbsp Bourbon sauce"). In response to detecting that the different portion of the web page 220 includes the target content as the triggering portion, the client computing device 210 can cause a suggestion suggesting, for example, a first-party action performable by an automated assistant or a third-party action performable by a third-party application different from the automated assistant, to be rendered via the user interface 230 of the client computing device 210. The suggestion can be rendered, for example, at a top bar of the user interface 230, a bottom bar of the user interface 230, or as an overlay (e.g., HTML overlay) on top of the web page 220.

Figure 2C:
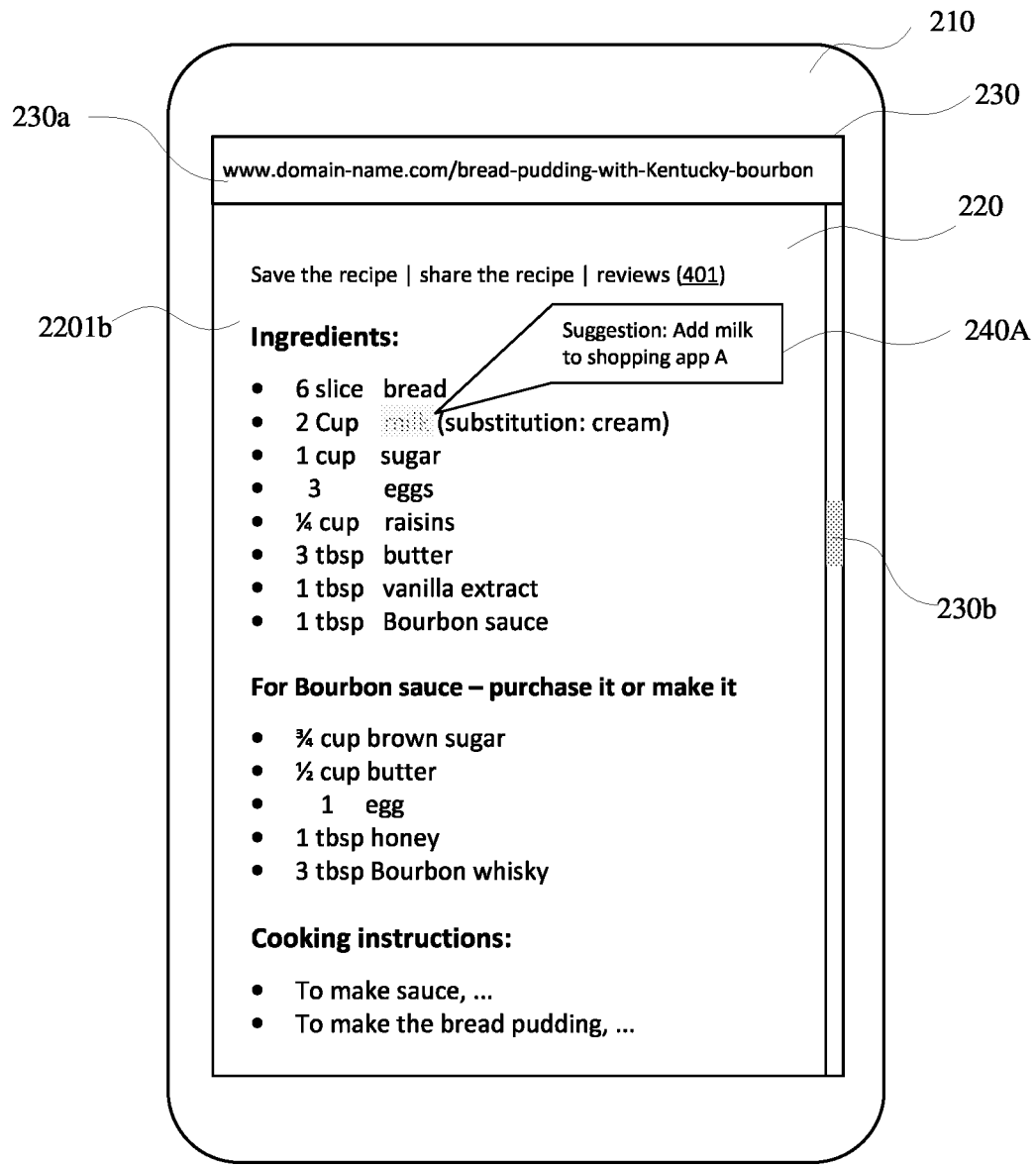
FIG. 2C depicts another example user interface of FIG. 1A or FIG. 1B, in accordance with various implementations.

Referring to FIG. 2C, as a non-limiting example, the aforementioned suggestion can be a suggestion 240A popped up on top of the web page 220. In this example, the client computing device 210 detects that the user interface 230 includes target content, e.g., "ingredients: 6 slice bread . . . 1 tbsp Bourbon sauce", and in response, causes the suggestion 240A generated based on the target content to be rendered. The suggestion 240A can, for example, include natural language content such as "Add ingredient X to shopping app A", where the ingredient X can be one of the ingredients listed in the recipe shown on the web page 220 and recommended for purchase by the user based on user data, and where the shopping app A can be a third-party application. The user data can include, for example, historical user data showing the interaction between a current user (and/or other users, "historical users") with the client computing device 210 and/or the web page 220, user preference collected from the current user and other users, and/or personal user data of the user for the content access application and other applications such as, camera, email, note-taking application recording a lack of ingredient milk or messaging application(s) having a message expressing the intend to purchase milk, and the present disclosure is not limited thereto. For example, based on the historical user data with the web page 220 such as the high frequency of historical users of the web page 220 ordering milk (or a certain milk product) using a suggestion rendered on top of the web page 220, the suggestion 240A can be popped up to recommend "milk" as the ingredient (or recommend the certain milk product) to add to the shopping app A.

Optionally, the client computing device 210 may detect that the user interface 230 includes a plurality of triggering portion, including, for example, first triggering portion and second triggering portion. Referring to FIG. 2B, the client computing device 210 may detect "6 slice bread . . . 1 tbsp Bourbon sauce" as the first triggering portion and detect "% cup brown sugar . . . 3 tbsp Bourbon whisky" as the second triggering portion. The first and second target content can be of the same type, or of different types. For example, the first triggering portion can be target content such as an ingredient section listing ingredients such as "6 slice bread . . . 1 tbsp Bourbon sauce", and the second triggering portion can be other content such as reviews by other users in a review section, or one or more images, be it an intermediate or final image, of the entree/food cooked using the listed ingredients in a cooking instructions section or a conclusion section.

Optionally, the suggestion 240A can be generated and/or triggered by a server computing device based on a plurality of factors, including click-through rate(s) (historical and/or predicted), type of the client computing device 210, user location, availability of a third-party application (or third-party device) to fulfill a third-party action suggested by the suggestion 240A, etc. For example, the suggestion 240A suggesting "Add ingredient X to shopping app A" can be generated based on the third-party application (i.e., shopping app A) is available at the client computing device 210 with login information of the user currently using the client computing device 210 accessible or saved, based on the shopping app A covers service at a delivery address selected by the user, and/or based on milk having being ordered for over a certain percentage of times when historical users see such suggestion 240A, in addition to be based on the target content (e.g., recipe content) of the web page 220. It's noted that the suggestion 240A can also suggest a first-party action performable via the automated assistant, such as showing "copy the list of ingredients to my notebook app" or "take a screenshot photo and save it in Photos" or simply "copy the list of ingredients" in a pop-up window, and let the automated assistant to determine subsequent actions or steps or recommend subsequent actions to the user for additional user input For example, the automated assistant can perform the first-party action and follow up with the user to ask "The list of ingredients copied. Where do you want to paste it?". In this example, to receive the additional user input, the automated assistant can display options, such as a first selectable icon representing a messaging application, and a second selectable icon representing a note-taking application.

Optionally, the suggestion 240A can be rendered to a user of the client computing device 210 audibly via an automated assistant. When the suggestion 240A suggests a third-party action ("add ingredient X") performable by a third-party application ("shopping app A"), such as "Add ingredient X to shopping app A", the automated assistant can be configured to receive user input that confirms an intent to add ingredient X to shopping app A. In this case, the automated assistant may determine that one or more parameters (quantity or brand of the ingredient X, etc.) of the third-party action are missing, and requires additional user input from the user that provides values of the one or more parameters.

Figure 2D:
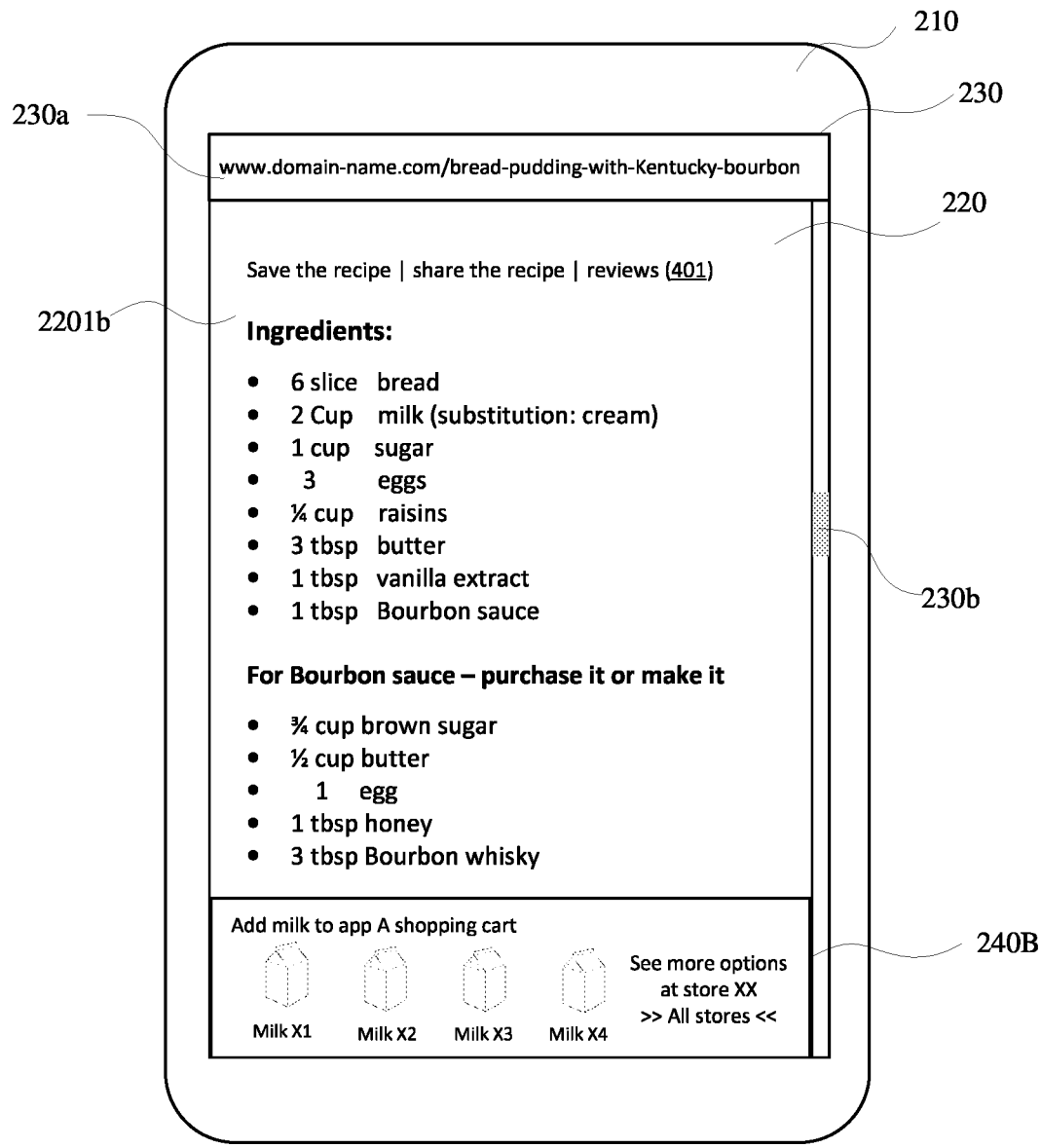
FIG. 2D depicts another example user interface of FIG. 1A or FIG. 1B, in accordance with various implementations.

In some implementations, referring to FIG. 2D, the aforementioned suggestion can be a suggestion 240B displayed at a bottom bar of the user interface 230. The suggestion 240B can include first natural language content such as "Add milk to app A shopping cart". Optionally or additionally, the suggestion 240B can include product information such as item image, brand, size, and price for each product (e.g., milk) listed in the suggestion 240B. For example, the suggestion 240B can list a first product Milk X1 with or without its price and size (e.g., half gallon milk from brand A with a price of $7.49), a second product Milk X2 with or without its price and size (e.g., 59 fl oz milk from brand B with a price of $4.99), a third product Milk X3 with or without its price and size (e.g., 1 gallon milk from brand C with a price of $5.99), and a fourth product Milk X4 with or without its price and size (e.g., 64 fl oz milk from brand D with a price of $3.69), where the first, second, third, and fourth products Milk X1 are of the same type (e.g., milk).

Optionally, the item image of each of the first, second, third, and fourth products 2401B~2407B can be configured to be selectable so that the user can select the corresponding product via user click, touch input, audio input, or other manners. Optionally or additionally, the suggestion 240B can include second natural language content such as "see more options at store XX", where the second natural language content can be selectable and when selected, an interface of the app A showing items (of the same type as the first, second, third, and fourth products Milk X1~X4) for sale at store XX can be rendered via the user interface 230 of the client computing device 210. Optionally or additionally, the suggestion 240B can include third natural language content that is selectable and when selected, an interface of the app A showing all stores available for shopping can be rendered to the user via the user interface 230.

Figure 2E:
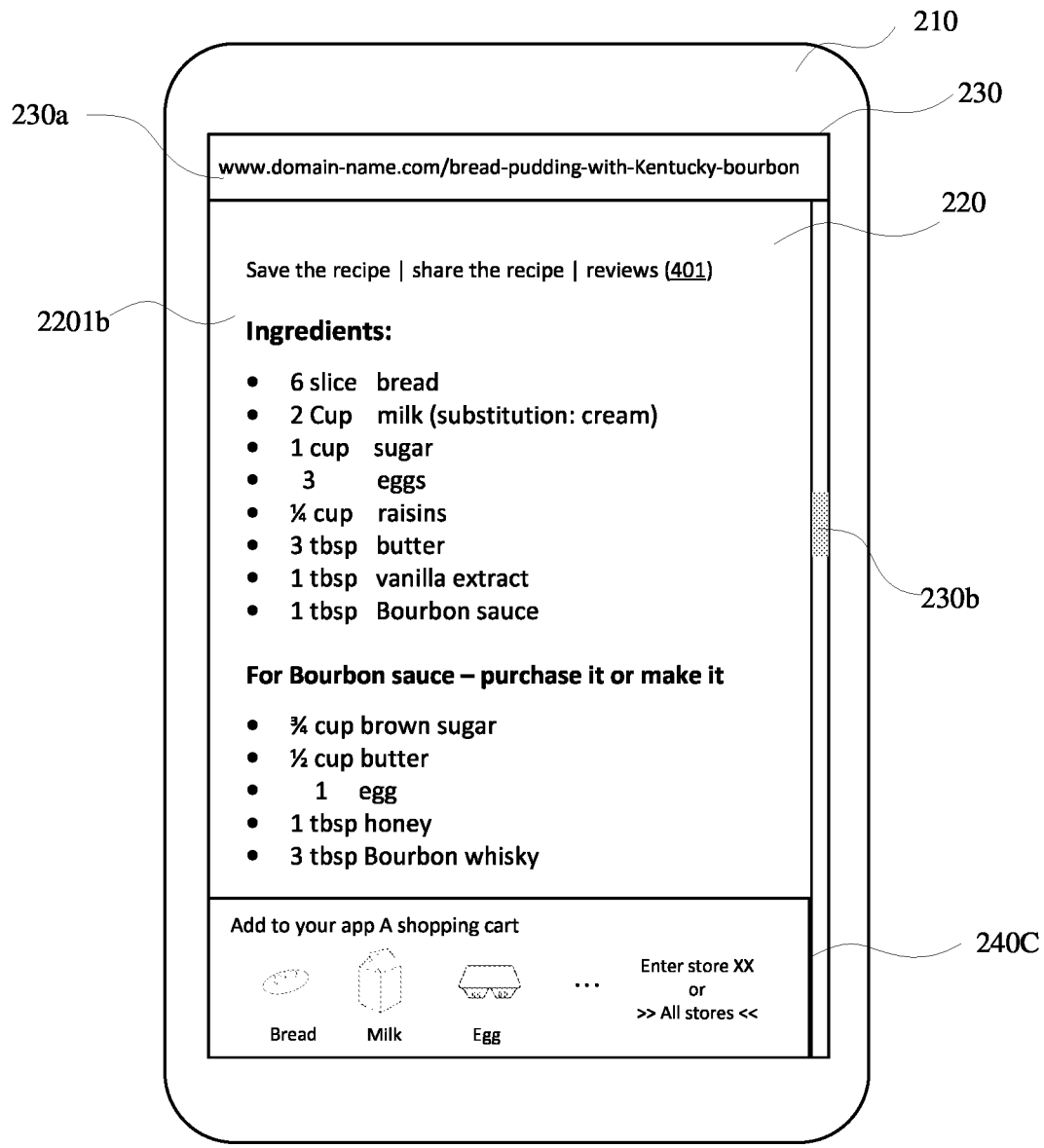
FIG. 2E depicts another example user interface of FIG. 1A or FIG. 1B, in accordance with various implementations.

In some implementations, referring to FIG. 2E, the aforementioned suggestion can be a suggestion 240C displayed at a bottom bar of the user interface 230. The suggestion 240C can include first natural language content such as "Add to your app A shopping cart" and product information such as item image, brand, size, and price for different ingredients listed in the recipe of the web page 220. For example, the suggestion 240C can list a first product with its price and size (e.g., 24 oz Bread with price of $2.79), a second product with its price and size (e.g., 0.5 gal milk from with a price of $5.49), and a third product with its price and size (e.g., half dozen eggs with a price of $3.49), where the first, second, and third products are of different types.

Optionally, the item image of each of the first, second, and third products (e.g., Bread, Milk, Egg) can be configured to be selectable so that the user can select the corresponding product via user click, touch input, audio input, or other manners. Optionally, the suggestion 240C can include a selectable symbol 241 indicating there are more products to purchase from the store XX for preparing the ingredients listed in the recipe. Optionally or additionally, the suggestion 240C can include second natural language content such as "enter store XX", where the second natural language content can be selectable and when selected, an interface of the shopping app A showing items for sale at store XX can be rendered via the user interface 230 of the client computing device 210. Optionally or additionally, the suggestion 240C can include third natural language content that is selectable and when selected, an interface of the shopping app A showing all stores available for shopping can be rendered to the user via the user interface 230.

Optionally, the suggestion, such as the suggestion 240A, the suggestion 240B, or the suggestion 240C, can be generated by the client computing device 210, or by one or more server computing devices that are in communication with the client computing device 210. In some implementations, the one or more server computing devices can generate a plurality of suggestions based on target content of the web page 220, rank the plurality of suggestions, and transmit the highest ranked suggestion to the client computing device 210 to be rendered to the user.

In some implementations, in case the suggestion such as the suggestion 240A (e.g., "add milk to shopping app A") is rendered to the user audibly via an automated assistant application, the client computing device 210 may, prior to generating such suggestion and via the automated assistant application, determine whether schema markup is used for a document (i.e., whether the document is a web page), determine whether the aforementioned app A is installed (or otherwise accessible) at the client computing device 210, and/or determine whether the user is logged into an account of the app A. In this case, the schema markup may be applied to determine whether the web page 220 includes any triggering portion (e.g., recipe), and if a tag corresponding to the recipe is detected from the schema markup, the web page 220 can be determined to include the recipe as the target content, so that the suggestion such as "add milk to shopping app A" can be generated and rendered audibly to the user. The user can respond to the suggestion by saying, "add milk to store XX on shopping app A", and continue the conversation with the automated assistant via audio input such as "what's the status of my shopping app A order?" "take me to the shopping app a cart" "find butter from store XX on shopping app A", "let's checkout on shopping app A", etc.

In various implementations, instead of using the client computing device 210 to process the user interface 230 that displays a portion of the web page 220, the client computing device 210 can transmit screen information ("user interface information") of the user interface 230 of the client computing device 210 to a server computing device. More detailed descriptions can be found elsewhere in this disclosure.

Optionally or alternatively, the client computing device 210 can detect that the aforementioned different portion of the web page 220 includes a plurality of triggering portion, such as first triggering portion and second triggering portion. For example, referring to FIG. 2B, the client computing device 210 can detect "6 slice bread . . . 1 tbsp Bourbon sauce" as the first triggering portion and detect "¾ cup brown sugar . . . 3 tbsp Bourbon whisky" as the second triggering portion. The first and second target content can be of the same type (e.g., being both target content), or of different types (e.g., one being target content and another being other content, or one being natural language content and another being image content).

In some implementations, the client computing device 210 can detect whether a portion of the document currently displayed at the user interface 230 of the client computing device 210 includes triggering portion (or target content) if one or more conditions are satisfied. The one or more conditions can include, for example, a first condition indicating whether the document is loaded at the user interface 230, a second condition indicating whether the user scrolls down a vertical scrollbar, a third condition indicating whether the user scrolls up the vertical scrollbar, a fourth condition indicating whether the user scrolls to the left a horizontal scrollbar, and/or a fifth condition indicating whether the user scrolls to the right the horizontal scrollbar. However, the present disclosure is not limited thereto and can use other conditions to trigger the detection of target content when appropriate.

It's noted that, instead of having the client computing device 210 to detect the triggering portion and determine when to render a suggestion based on the triggering portion, the client computing device 210 can transmit to a server computing device (e.g., the server computing device 13 in FIG. 1) at least document information of a document (e.g., web page 220) that is at least partially displayed at the user interface 230 of the client computing device 210, for the server computing device to detect the triggering portion and to determine when to render a suggestion. For example, in response to determining that the web page 220 is loaded via the web browser, the client computing device 210 can transmit to a server computing device (e.g., server computing device 13 in FIG. 1) the document information of the web page 220 and/or user interface information of the user interface 230 of the client computing device 210.

The document information can include, for example, a URL address (www.domain-name.com/bread-pudding-with-kentucky-bourbon) of the web page 220 for the server computing device to access content of the web page 220. As a non-limiting example, the user interface information of the user interface 230 of the client computing device 210 can include dimensions (width and height) of the user interface 230 and/or font size. Optionally, the dimensions of the user interface 230 can be measured by multiplying a length of the user interface 230 in pixel by a width of the web page 220 in pixel. In various implementations, the dimensions of the web page 220 can vary when the web page 220 is displayed at different user interfaces of different client computing devices.

The server computing device, after receiving the document information of the document from the client computing device 210, can process the document information to determine, for example, whether the content of the web page 220 includes triggering portion. As a non-limiting example, when the web page 220 displayed at the client computing device 210 is about a recipe, the server computing device may retrieve the URL of the web page 220, access the content of the web page 220 using the URL, and process the content of the web page 220 to identify ingredients (e.g., "6 slice bread . . . 1 tbsp Bourbon sauce" in FIG. 2B) listed under a subtitle of "Ingredient" as target content. As another non-limiting example, the server computing device may identify recipe content including the ingredients, cooking instructions, and a story introducing the creation of the recipe as the target content.

Optionally, the server computing device may identify a plurality of target content, including at least first target content and second target content. For example, referring to FIG. 2B, the server computing device can process the content of the web page 220, to identify "6 slice bread . . . 1 tbsp Bourbon sauce" as the first target content and "¾ cup brown sugar . . . 3 tbsp Bourbon whisky" as the second target content. Optionally, the first and second target content can be of different types.

In some implementations, the server computing device can access the document and index the document to determine whether the document includes any target content. It's noted that when indexing the document such as the web page 220, the server computing device may use a raw HTML of the web page 220 and/or metadata extracted from the web page 220. In some implementations, the server computing device can generate and transmit to the client computing device 210 an indication signal or message indicating whether the document for which the document information is transmitted by the client computing device 210 to the server computing device, includes any target content.

In various implementations, the server computing device can determine, based on the document information, coordinate information of the target content in the document (e.g., web page 220) displayed at a user interface (e.g., the user interface 230) of the client computing device 210. The server computing device can cause, based on the coordinate information of the target content, to determine whether and/or when to trigger a suggestion that is related to the document of which the document information is received by the server computing device from the client computing device 210.

In various implementations, the server computing device can determine whether the web page 220 includes target content and the client computing device 210 can determine when the target content is rendered at the user interface 230 of the client computing device 210 so as to trigger a suggestion. For example, the client computing device 210 can send the URL of the web page 220 to the server computing device, where the server computing device can detect whether a DOM node in a DOM of the web page 220 corresponds to target content (or other triggering portion) and transmit a detecting signal or message indicating whether the web page 220 includes triggering portion to the client computing device 210. If the server computing device detects a DOM node in the DOM of the web page 220 representing the triggering portion, the server computing device can transmit information of the detected DOM node to the client computing device 210, along with the detecting signal (or message).

After receiving the detecting signal or detecting message from the server computing device, the client computing device 210 can determine whether the DOM node (if there is any) detected by the server computing device is executed when the current user interface 230 of the client computing device 210 displays a portion of the document. If the client computing device 210 determines that the node detected by the server computing device as representing the target content is being executed when the user interface 230 of the client computing device 210 displays a portion of the document, the client computing device 210 can determine that the DOM condition is satisfied (i.e., the portion of the document currently displayed includes the triggering portion), and in response to the DOM condition being satisfied, causes one or more suggestions (which may or may not be related to the triggering portion) to be rendered via the user interface 230 of the client computing device.

In some implementations, the client computing device 210, or the server computing device, can collect user historical data including a measured time period for one or more users to select or otherwise interact with a suggestion such as the suggestion 240B when the document is loaded at an application. The user historical data can be included in the document information for the document, and can include, for each measured time period, content of the suggestion, a location of the suggestion, and a location or content of triggering portion in the document (where the suggestion is triggered for display at least based on the triggering portion being displayed), in addition to the measured time period. Alternatively or additionally, the historical user data can further include a distribution of the measured time period for the one or more users, and/or statistics of the content or location of the suggestion and of the content or location of the corresponding triggering portion.

Based on the collected historical user data, the client computing device 210 (or the server computing device) can determine when one or more triggering conditions (e.g., the aforementioned coordinate condition, DOM condition, temporal condition, or attention-tracking condition, etc.) are satisfied so as to render one or more suggestions (e.g., the suggestion 240B) to a current user. For example, if it's determined that it historically takes about approximately 2 min on average from loading the web page 220 to different users (e.g., % of the historical users of the document) to click or otherwise select the suggestion 240B, the client computing device 210 (or the server computing device) can cause the suggestion 240B to be rendered to the current user approximately 2 min after the web page 220 is loaded at the web browser.

In some other implementations, the client computing device 210, or the server computing device, can parse the HTML of the web page 220 and predict, based on the parsing, a minimum browsing time it takes for a user to reach the target content. In this case, the client computing device 210 (or the server computing device) can cause the suggestion 240B to be rendered to the current user approximately at the time when the minimum browsing time has passed since the web page 220 is loaded via the user interface 230 to the current user.

In some other implementations, the client computing device 210, or the server computing device, can determine when to render the suggestion based on one or more navigational gesture signals. For example, the one or more navigational gesture signals can include a first navigational gesture signal indicating no user action for a predetermined time while the document is being opened at the user interface (e.g., a user has stopped scrolling for at least a predetermined time, such as t milliseconds). In response to detection of the first navigational gesture signal, the client computing device 210 (or the server computing device) can cause the suggestion 240B to be rendered to the current user as soon as it's monitored that the user has stopped scrolling for the predetermined time, because in this case, stopping scrolling for at least the predetermined time indicates a high level of user interest/attention (i.e., the attention-tracking condition being satisfied).

In some other implementations, the client computing device 210, or the server computing device, can determine whether to render the suggestion based on historical user data such as a click-through rate of the suggestion by historical users, in addition to the identifying of the triggering portion. For example, subsequent to the client computing device 210 (or the server computing device) detecting that the web page 220 includes triggering portion and prior to the rendering of one or more suggestions, the client computing device 210 (or the server computing device) may determine that the one or more suggestions have a click-through rate lower than a predetermined threshold to render any suggestion. In this example, the one or more suggestions will not be rendered to the user due to the low click-through rate.

Figure 3:
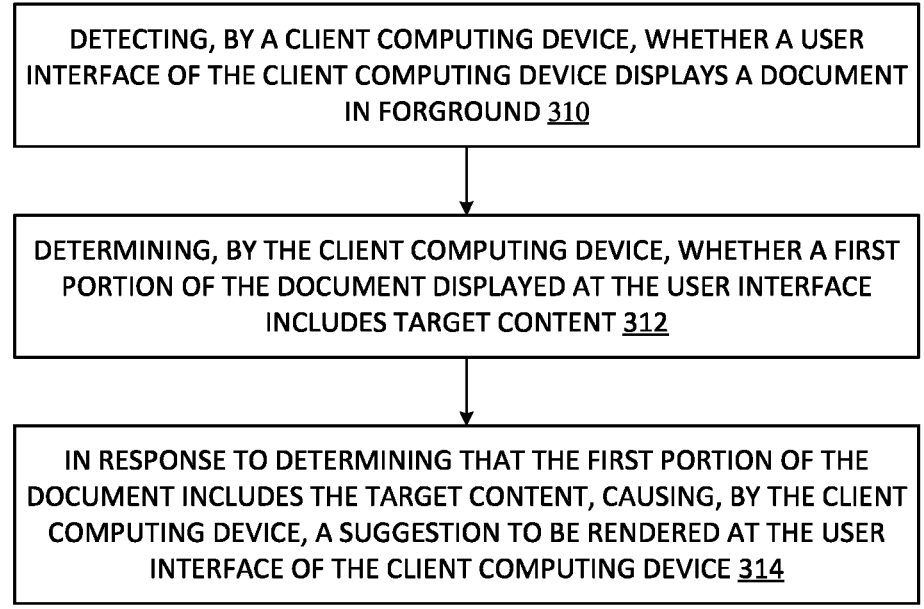
FIG. 3 is a flowchart illustrating an example method of triggering an on-content suggestion for a content access application, in accordance with various implementations.

FIG. 3 is a flowchart illustrating an example method 300 of triggering a suggestion for a content access application, in accordance with various implementations. As shown in FIG. 3, the method 300 includes at block 310, detecting, by a client computing device, whether a user interface of the client computing device displays a document (e.g., web page) in the foreground. In some implementations, the document (e.g., web page) can be displayed by a content access application, such as a web browser, at the user interface of the client computing device. The document can be fully displayed at the user interface, or partially displayed at the user interface, depending on a size of the document at the user interface. In some implementations, the user interface of the client computing device can display a plurality of interfaces, where the plurality of interfaces are from the same application (e.g., the content access application) or from different applications. In these cases, the client computing device can detect whether the user interface includes a document that is displayed by an application running foreground.

The method 300 can further include, at block 312, determining, by the client computing device, whether a first portion of the document displayed at the user interface includes target content. For example, the client computing device can detect whether certain types of schema markup for the target content is present/executed in the foreground of the client computing device. If a desired type of schema markup is present/executed in the foreground, the client computing device determines that the first portion of the document displayed at the user interface includes target content.

The method 300 can further include at block 314, in response to determining that the first portion of the document includes the target content, causing, by the client computing device, a suggestion to be rendered at the user interface of the client computing device. In some implementations, the suggestion can be preemptively generated for the target content. In some implementations, the suggestion can be a selectable symbol and/or selectable natural language content that suggests a third-party action performable by a third-party application, such as a shopping app A. Optionally, the suggestion can be rendered at a top bar, a bottom bar, or as an overlay at the user interface of the client computing device. Optionally, more than one suggestion can be rendered at the user interface.

Figure 4:
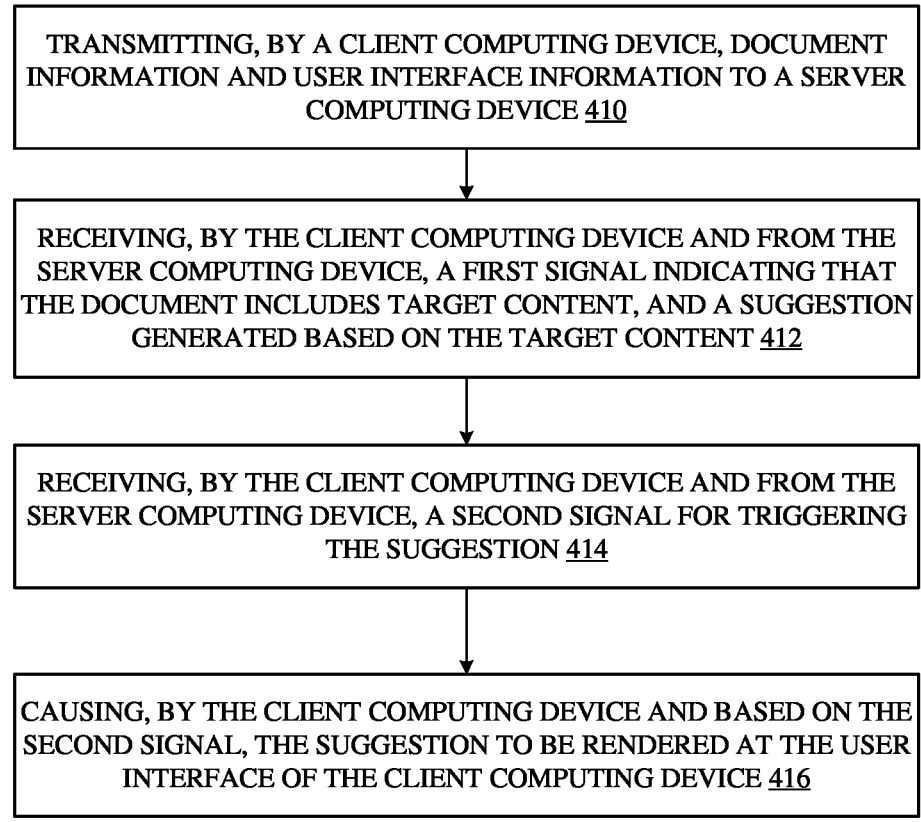
FIG. 4 is a flowchart illustrating another example method of triggering an on-content suggestion for a content access application, in accordance with various implementations.

FIG. 4 is a flowchart illustrating another example method 400 of triggering an suggestion for a content access application in accordance with various implementations. As shown in FIG. 4, the method 400 can include, at block 410, transmitting, by a client computing device, document information and user interface information to a server computing device. The document information can include, for example, an address to retrieve the document, historical user data of the document, and/or content of the document (e.g., in the format of an image or markup language). The user interface information can include, for example, a size of the user interface of the client computing device to display the document, and/or font size of natural language content in the document displayed at the user interface of the client computing device.

In various implementations, the method 400 can further include, at block 412, receiving, by the client computing device and from the server computing device, a first signal or (a first message) indicating that the document includes triggering portion (e.g., target content), and a suggestion generated based on the target content. For example, the first signal or message can be generated by the server computing device and can indicate that the document includes the target content. Optionally, the suggestion can be a suggestion for a first-party action performable by an automated assistant. For example, for a web page describing an upcoming sports game, descriptions in the web page about a specific date (e.g., Aug. 8, 2028, at 8:00 am) or data range tickets for the upcoming sports game will be on sale can be determined as triggering portion or target content, and a suggestion to perform a first-party action (e.g., add a reminder to buy three tickets for the upcoming sports game) can be rendered to the user. When the first-party action is selected or confirmed by the user, the automated assistant can perform the first-party action, for example, by adding the reminder to buy three tickets in a calendar application. Optionally, the suggestion can be a suggestion for a third-party action performable by a third-party application, and repeated descriptions are omitted herein. Optionally, the suggestion can be generated based on the target content, and/or based on device information of the client computing device. The device information of the client computing device can include whether the third-party application is installed at the client computing device, whether a user of the client computing device has set up and/or log into the third-party application when reading the document, a location of the client computing device (indicating whether service provided by the third-party action is available to the location), and/or other information.

In various implementations, the method 400 can further include, at block 414, receiving, by the client computing device and from the server computing device, a second signal (or a second message) for triggering the suggestion. For example, the server computing device can determine one or more triggering conditions to trigger the suggestion, and determine whether any of the one or more triggering conditions of the suggestion is satisfied. In response to determining that a triggering condition, of the one or more triggering conditions, is satisfied, the server computing device can generate the second signal or the second message and transmit the second signal or the second message to the client computing device for triggering the rendering of the suggestion.

As a non-limiting example, the triggering condition can be a temporal condition indicating whether a first period has passed since the document is loaded (e.g., by the content access application such as a web browser). In this example, the first period can be determined based on a historical distribution of selection times it takes for historical users/readers of the document to select the suggestion rendered for triggering portion of the document, after the document is loaded. In this example, the triggering/temporal condition is determined to be satisfied when the first period has passed since the document is loaded. In other words, the suggestion can be triggered or rendered after the first period has passed since the document is loaded.

As another non-limiting example, the triggering condition can indicate whether the target content is displayed in foreground at the user interface of the client computing device. In this example, the triggering condition can be determined to be satisfied when the target content is detected as being displayed in the foreground at the user interface of the client computing device, so that the suggestion is triggered or rendered at the user interface. In some implementations, whether the target content is detected as being displayed in the foreground can be based on coordinate information of the target content. For example, when the user interface of the client computing device is configured to display approximately 20% of a document at a given moment, a user will not see target content having coordinate information indicating that the target content is located at approximately 35% of the document. In this example, the user will need to scroll down an additional 15% or more of the document to see the target content. When the user scrolls down the additional 15% or more (say, 20% when the entire target content is displayed at an upper portion of the user interface of the client computing device), the suggestion can be triggered or rendered to the user. Optionally, instead of percentage, the coordinate information can be represented using one or more distances measured by pixels or inches, where relevant descriptions of the coordinate information can be found in other portions of this disclosure and repeated descriptions are omitted herein.

Alternatively or additionally, as a further non-limiting example, the triggering condition can indicate whether a navigational gesture signal is detected. In this example, the navigational gesture signal can be detected if the user has stopped scrolling for a predetermined period of time, indicating the portion of the document displayed in the foreground at the user interface of the client computing device includes additional target content or content of interest to the user.

In various implementations, the method 400 can further include, at block 416, causing, by the client computing device and based on the second signal, the suggestion to be rendered at the user interface of the client computing device. In some implementations, the second signal can further include a location for rendering the suggestion, such as a top bar, a bottom bar, or an overlay, at the user interface of the client computing device. In these cases, the suggestion can be rendered at the location indicated by the second signal.

Figure 5:
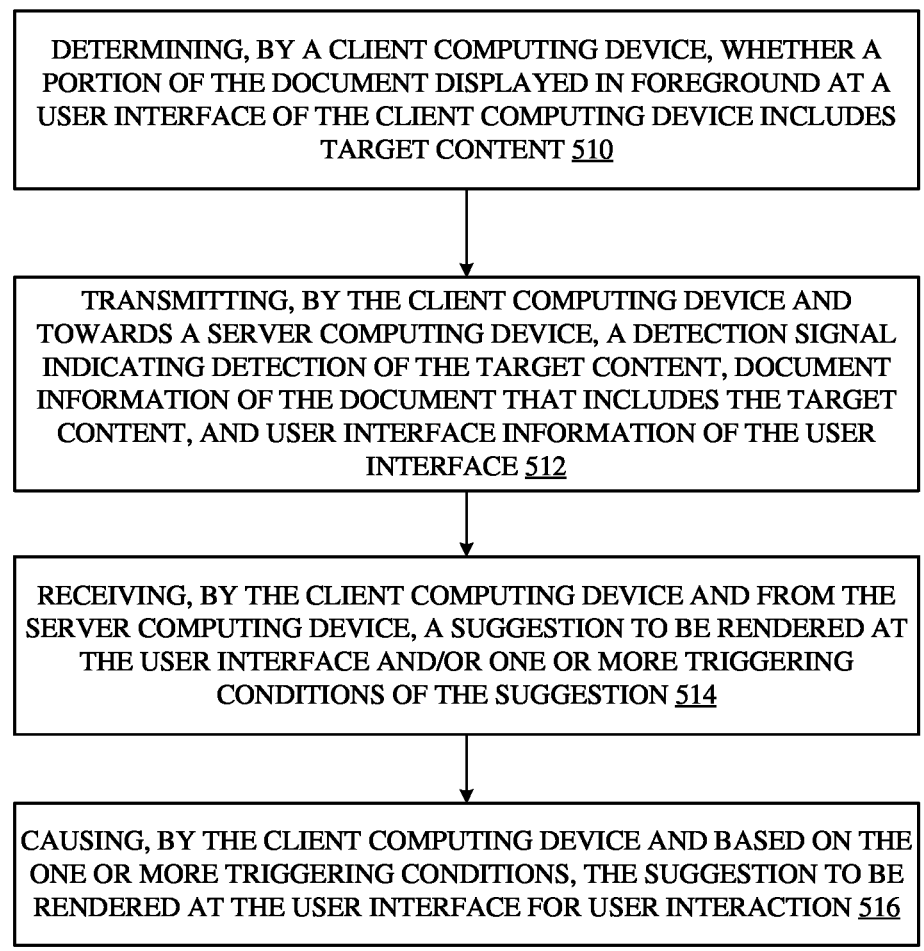
FIG. 5 is a flowchart illustrating an additional example method of triggering an on-content suggestion for a content access application, in accordance with various implementations.

FIG. 5 is a flowchart illustrating an additional example method 500 of triggering a suggestion for a content access application based on target content of a document displayed by the content access application, in accordance with various implementations. As shown in FIG. 5, the method 500 can include, at block 510, determining, by a client computing device, whether a portion of the document displayed in foreground at a user interface of the client computing device includes target content. Optionally, the client computing device can detect whether the portion of the document displayed in the foreground includes the target content using any of the aforementioned detecting methods when appropriate.

In various implementations, the method 500 can include, at block 512, transmitting, by the client computing device and to a server computing device, a detection signal/message indicating detection of the triggering portion, document information such as content and/or location of the triggering portion in the document, and user interface information describing dimensions and font size of the user interface of the client computing device and/or the content access application. The document information can be the same as or similar to the aforementioned document information, and the user interface information can be the same as or similar to the aforementioned user interface information. Repeated descriptions are not provided herein.

In various implementations, the method 500 can include, at block 514, receiving, by the client computing device and from the server computing device, a suggestion to be rendered at the user interface and/or one or more triggering conditions to trigger the rendering of the suggestion. The suggestion, and the one or more triggering conditions can be the same as or similar to that in the above descriptions, and repeated descriptions are omitted herein.

In various implementations, the method 500 can include, at block 516, causing, by the client computing device and based on the one or more triggering conditions, the suggestion to be rendered at the user interface for user interaction. For example, in response to determining that a triggering condition, of the one or more triggering conditions to trigger the suggestion, is satisfied, the client computing device can cause the suggestion to be rendered at the user interface of the client computing device. The suggestion can be a selectable element representing a third-party action or a first-party action, and the user can select the suggestion to perform a third-party action, such as adding a product to a shopping cart of shopping app A.

Figure 6:
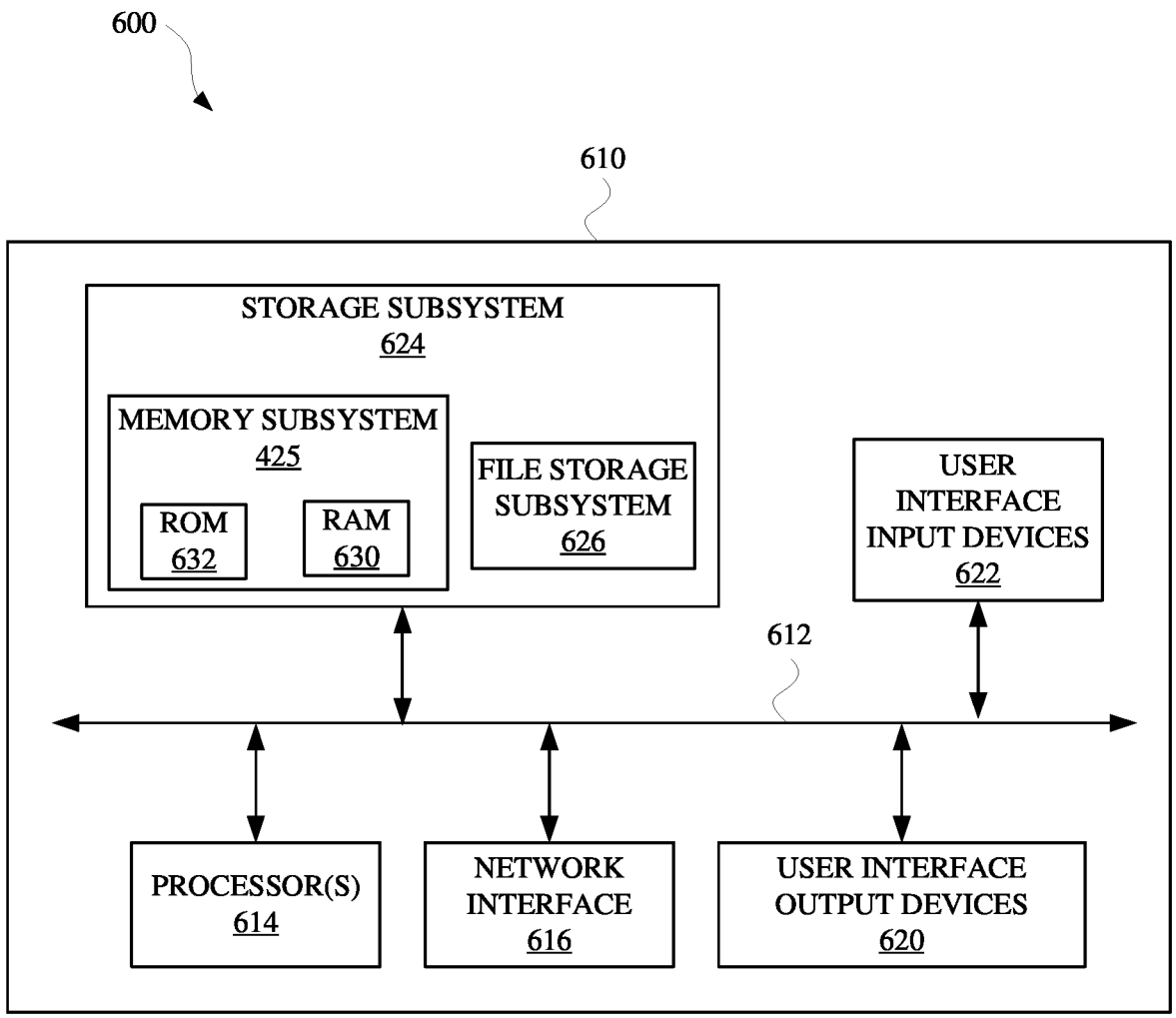
FIG. 6 illustrates an example architecture of a computing device, in accordance with various implementations.

FIG. 6 is a block diagram of an example computing device 610 that may optionally be utilized to perform one or more aspects of techniques described herein. In some implementations, one or more of a client computing device, a cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors.

Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In various implementations, a method implemented by one or more processors is provided, which includes: transmitting, for example, by a client computing device to a server computing device: document information that identifies a document displayed at a user interface of the client computing device, and user interface information that identifies type and/or dimensional information of the user interface of the client computing device, where the type of the user interface of the client computing device can be used to determine the dimensional information of the user interface of the client computing device. The document can be a web page, or other public or private documents such as a PDF file. The method further includes receiving, for example, by the client computing device from the server computing device and in response to the transmitting: a suggestion that is related to content of the document, and a coordinate condition, where the coordinate condition can be generated by the server computing device based on (1) the type and/or the dimensional information of the user interface, and (2) a triggering portion determined from the document, for rendering the suggestion. The method can further include, in response to receiving the suggestion and the coordinate condition: (i) monitoring coordinate information of the triggering portion of the document with respect to the user interface, while the document is displayed at the user interface, for satisfaction of the coordinate condition, and (ii) in response to determining satisfaction of the coordinate condition during the monitoring: causing the suggestion to be rendered at the user interface.

These and other implementations of the technology disclosed herein can optionally include one or more of the following features.

In some implementations, the coordinate condition includes: a first distance from an upper edge of the document displayed at the user interface (i.e., the upper edge of the user interface) to the triggering portion of the document, and/or a second distance from a side edge of the document displayed at the user interface to the triggering portion of the document. In some versions of those implementations, the coordinate condition includes the first distance and the first distance is expressed as a first quantity of pixels from the upper edge of the document.

In some implementations, the suggestion is a selectable suggestion that, when selected, causes an automated assistant application accessible via the client computing device to perform one or more actions that are specific to the content of the document. In some versions of those implementations, the one or more actions comprise causing an additional application, of the client computing device, to open in a state that is specific to the content.

In some implementations, the triggering portion determined from the document, for rendering the suggestion, can include target content determined by the server computing device based on the content in the document. In some other implementations, the triggering portion determined from the document, for rendering the suggestion, can include a historical portion determined by the server computing device based on historical user data associated with the document. The historical user data can include frequencies of historical user interaction for one or more suggestions that are related to the content of the document, and wherein the historical portion of the document is determined by being a portion of the document that was historically displayed at the user interface when a suggestion, of the one or more suggestions, that has a highest frequency of historical user interaction was historically triggered at the user interface.

In some implementations, the coordinate information changes in response to a user scrolling input that scrolls the document to change content of the document displayed at the user interface. For example, when the document is just loaded at a content access application of the client computing device, the coordinate information of the triggering portion of the document can include a first distance being approximately 800 pixels from an upper edge of the user interface (which can be a display screen or portion thereof) of the client computing device that displays the document to an upper edge (or a lower edge, or a central portion) of the triggering portion of the document. In this example, the triggering portion may not be displayed to a user of the client computing device is the user interface or the display screen of the client computing device is shorter than a dimension of approximately 800 pixels. When the user scrolls a scroll bar of the user interface of the client computing device, the client computing device can detect a user scrolling input, which scrolls the document down, say, about approximately 600 pixels. After the user scrolls down the approximately 600 pixels, the coordinate information of the triggering portion can include a modified first distance being approximately 200 pixels, which is a distance measured from the upper edge of the display screen to the triggering portion of the document. In this case, when the user interface or display screen of the client computing device is longer than 200 pixels, the triggering portion of the document can be displayed to the user for read via the user interface.

In some implementations, different client computing devices can have user interfaces of different dimensions, and the coordinate information of the triggering portion of the document can be different when the document is displayed at the different client computing devices (or when the document is displayed via different content access applications of the same client computing device). For example, when the document is just loaded at a content access application of a first client computing device, the coordinate information of the triggering portion of the document can include a first distance being approximately 800 pixels from an upper edge of the user interface of the first client computing device that displays the document to the triggering portion of the document. When the document is just loaded at a content access application of a second client computing device, the coordinate information of the triggering portion of the document can include a first distance being approximately 900 pixels from an upper edge of the user interface of the second client computing device that displays the document to the triggering portion of the document, where the second client computing device is different from the first client computing device.

In some implementations, in generating the coordinate condition, the server computing device uses the type and/or the dimensional information of the user interface to determine a distance measure at which the triggering portion of the document will be rendered within the user interface, and generates the coordinate condition based on the distance measure. For example, the distance measure can include a first distance measure calculated by subtracting a length of the user interface of the client computing device from the first distance that measures a distance from an upper edge of the user interface that displays the document to a lower edge of the triggering portion of the document. In another example, the distance measure can include a second distance measure calculated by subtracting a length of the user interface of the client computing device from the first distance that measures a distance from an upper edge of the user interface that displays the document to an upper edge of the triggering portion of the document. In a further example, the distance measure can be a distance range varying from the aforementioned first distance measure to the second distance measure.

In some implementations, causing the suggestion to be rendered at the user interface includes: causing the suggestion to be rendered at a bottom bar or a top bar, of the user interface, and/or causing the suggestion to be rendered via an HTML overlay. The suggestion can also be rendered at other areas of the user interface, and the present disclosure is not limited thereto.

In various implementations, a method implemented by one or more processors of a server computing device is provided and includes receiving, from a client computing device: document information that identifies a document displayed at a user interface of the client computing device, and user interface information that identifies type and/or dimensional information of the user interface of the client computing device. The method can further include in response to the receiving: identifying, using the document information, a suggestion that is related to content of the document, and generating a coordinate condition. The coordinate condition can be generated based on the type and/or the dimensional information of the user interface and based on a triggering portion of the document for rendering the suggestion. The method can further include: transmitting, to the client computing device: the suggestion and the coordinate condition, where transmitting the suggestion and the coordinate condition causes the client computing device to monitor for satisfaction of the coordinate condition and to render the suggestion when the coordinate condition is satisfied.

In some implementations, the suggestion is pre-generated and is indexed, in an index, based on the document information, and identifying the suggestion comprises using the document information to identify the pre-generated suggestion in the index. In these implementations, the document information can comprise a resource identifier of the document. In these implementations, the resource identifier can be a uniform resource locator of the document.

In some implementations, the document information includes the content of the document, and identifying the suggestion comprises processing the content to generate the suggestion.

In various implementations, a method implemented by one or more processors is provided and the method includes: identifying, for a document displayed at a user interface of a client computing device, a historical statistical distribution of selection times, the historical statistical distribution of selection times being generated based on historical selection times of a corresponding suggestion related to content of the document and rendered contemporaneously with the document. The method can further include: generating, based on the historical statistical distribution, a temporal condition for rendering a suggestion related to the content. In response to rendering of the document at the user interface of the client computing device, the method can further include causing the client computing device to: monitor for satisfaction of the temporal condition, and render the suggestion when the coordinate condition is satisfied.

In some implementations, the historical selection times are each relative to corresponding initial renderings of the document and wherein the temporal condition is relative to an initial rendering of the document. In some implementations, the method can further include: identifying, for the client computing device or for a user account accessing the document at the computing device, a historical measure of suggestion selection, where generating the temporal condition is based on the historical statistical distribution and the historical measure of suggestion selection. In these implementations, generating the temporal condition based on the historical statistical distribution and the historical measure of suggestion selection comprises: selecting a time, from the historical statistical distribution, in dependence on the historical measure of suggestion.

In some implementations, generating the temporal condition based on the historical statistical distribution comprises: selecting a time, from the historical statistical distribution, where selecting the time is in dependence on probabilities defined by the historical statistical distribution; and generating the temporal condition based on the time. In these implementations, the suggestion is selected at the client computing device after rendering of the suggestion and the method can further include: determining an actual selection time for the selection of the suggestion at the client computing device; and updating the historical statistical distribution based on the actual selection time.

In some implementations, the historical statistical distribution of selection times are all specific to the document. In some implementations, the historical statistical distribution of selection times can include selections from multiple disparate documents determined to have one or more features in common, and the historical statistical distribution is utilized, for the document, in response to determining the document also has the one or more features.

In various implementations, a method implemented by one or more processors of a client computing device is provided and the method includes: transmitting, to a server computing device: document information that identifies a document displayed at a user interface of the client computing device. The method can further include receiving, in response to the transmitting: a suggestion that is related to content of the document, and one or more conditions. The one or more conditions can include the aforementioned document object model (DOM) condition, temporal condition, and/or coordinate condition. The method can further include, in response to receiving the suggestion and the one or more conditions: (1) monitoring for satisfaction of at least one of the one or more conditions in rendering of the document in the user interface, and (2) causing the suggestion to be rendered at the user interface in response to determining there is satisfaction of at least one of the one or more conditions.

In some implementations, the one or more conditions can include the temporal condition and the coordinate condition, and in this case, monitoring for satisfaction of the at least one of the one or more conditions comprises determining satisfaction of either the temporal condition or the coordinate condition.

In various implementations, a method implemented by one or more processors of a client computing device is provided and the method includes: transmitting, to a server computing device, document information that identifies a document displayed at a user interface of the client computing device; and receiving, in response to the transmitting, a suggestion that is related to content of the document, a node of a document object model (DOM) of the document, and a coordinate condition. The coordinate condition can be generated by the server computing device based on: a type and/or dimensional information of the user interface, and a triggering portion determined from the document, for rendering the suggestion. The method can further include: in response to receiving the suggestion and the node of the DOM of the document, monitoring for active execution, of markup language corresponding to the node of the DOM, in rendering of the document in the user interface. In response to determining there is active execution of the markup language correspond to the node of the DOM, the method can further include: causing the suggestion to be rendered at the user interface.

In various implementations, a method implemented by one or more processors is provided and the method includes: identifying, using document information for a document displayed at a user interface of a client computing device, a suggestion that is related to content of the document. The method can further include: generating a coordinate condition, where generating the coordinate condition is based on a type and/or dimensional information of the user interface and is based on a triggering portion, of the document, for rendering the suggestion. The method can further include, in response to identifying the suggestion and generating the coordinate condition: monitoring coordinate information of the triggering portion of the document with respect to the user interface, while the document is displayed at the user interface, for satisfaction of the coordinate condition. In response to determining satisfaction of the coordinate condition during the monitoring, the method can further include: causing the suggestion to be rendered at the user interface. In these implementations, the one or more processors consist of processors of a client device (or a client computing device)

What is claimed is:

1. A method implemented using one or more processors of a client computing device, the method comprising:
   transmitting, to a server computing device:
      document information that identifies a document displayed at a user interface of the client computing device, and
      user interface information that identifies type and/or dimensional information of the user interface of the client computing device;
   receiving, in response to the transmitting:
      a suggestion that is related to content of the document, and
      a coordinate condition that is specific to the type and/or dimensional information of the user interface at which the document is displayed, that causes the suggestion to be rendered when satisfied, and that is generated by the server computing device based on:
         the type and/or the dimensional information of the user interface, and
         a triggering portion of the document displayed at the user interface of the client device, wherein the triggering portion specifies a particular portion of the document at which the content of the document that the suggestion is related to is located, and wherein the triggering portion is determined based on a quantity of historical users that selected a previous suggestion, when the content of the document was displayed, exceeding a threshold; and
   in response to receiving the suggestion and the coordinate condition:
      monitoring coordinate information of the document with respect to the user interface, while the document is displayed at the user interface, for satisfaction of the coordinate condition, and
      in response to determining satisfaction of the coordinate condition during the monitoring:
         causing the suggestion to be rendered at the user interface.

2. The method of claim 1, wherein the coordinate condition includes:
   a first distance from an upper edge of the document displayed at the user interface to the triggering portion of the document, and/or
   a second distance from a side edge of the document displayed at the user interface to the triggering portion of the document.

3. The method of claim 2, wherein the coordinate condition includes the first distance and the first distance is expressed as a first quantity of pixels from the upper edge of the document.

4. The method of claim 1, wherein the document is a web page.

5. The method of claim 1, wherein the suggestion is a selectable suggestion that, when selected, causes an automated assistant application accessible via the client computing device to perform one or more actions that are specific to the content of the document.

6. The method of claim 5, wherein the one or more actions comprise causing an additional application, of the client computing device, to open in a state that is specific to the content.

7. The method of claim 1, wherein:
   the triggering portion determined from the document, for rendering the suggestion, includes target content determined by the server computing device based on the content in the document.

8. The method of claim 1, wherein:
   the triggering portion determined from the document, for rendering the suggestion, includes a historical portion determined by the server computing device based on historical user data associated with the document.

9. The method of claim 8, wherein the historical user data includes frequencies of historical user interaction for one or more suggestions that are related to the content of the document, and wherein the historical portion of the document is determined by being a portion of the document that was historically displayed at the user interface when a suggestion, of the one or more suggestions, that has a highest frequency of historical user interaction was historically triggered at the user interface.

10. The method of claim 1, wherein the coordinate information changes in response to a user scrolling input that scrolls the document to change content of the document displayed at the user interface.

11. The method of claim 1, wherein in generating the coordinate condition, the server computing device uses the type and/or the dimensional information of the user interface to determine a distance measure at which the triggering portion of the document will be rendered within the user interface, and generates the coordinate condition based on the distance measure.

12. The method of claim 1, wherein causing the suggestion to be rendered at the user interface includes:
   causing the suggestion to be rendered at a bottom bar or a top bar, of the user interface, and/or
   causing the suggestion to be rendered via an HTML overlay.

13. A method implemented using one or more processors of a server computing device, the method comprising:
   receiving, from a client computing device:
      document information that identifies a document displayed at a user interface of the client computing device, and
      user interface information that identifies type and/or dimensional information of the user interface of the client computing device;
   in response to the receiving:
      identifying, using the document information, a suggestion that is related to content of the document;
      generating a coordinate condition that is specific to the type and/or dimensional information of the user interface at which the document is displayed and that causes the suggestion to be rendered when satisfied, wherein generating the coordinate condition is based on the type and/or the dimensional information of the user interface and is based on a triggering portion of the document that is displayed at the user interface of the client device for rendering the suggestion, wherein the triggering portion specifies a particular portion of the document at which the content of the document that is the suggestion is related to is located, and wherein the triggering portion is determined based on a quantity of historical users that selected a previous suggestion, when the content of the document was displayed, exceeding a threshold; and transmitting, to the client computing device:
the suggestion and the coordinate condition,
wherein transmitting the suggestion and the coordinate condition causes the client computing device to monitor for satisfaction of the coordinate condition and to render the suggestion when the coordinate condition is satisfied.

14. The method of claim 13, wherein the suggestion is pre-generated and is indexed, in an index, based on the document information, and wherein identifying the suggestion comprises using the document information to identify the pre-generated suggestion in the index.

15. The method of claim 14, wherein the document information comprises a resource identifier of the document.

16. The method of claim 15, wherein the resource identifier is a uniform resource locator of the document.

17. The method of claim 13, wherein the document information comprises the content of the document and wherein identifying the suggestion comprises processing the content to generate the suggestion.

18. A method implemented using one or more processors, the method comprising:
identifying, for a document displayed at a user interface of a client computing device, a historical statistical distribution of selection times, the historical statistical distribution of selection times being generated based on historical selection times of a corresponding suggestion related to content of the document and rendered contemporaneously with the document;
generating, based on the historical statistical distribution, a temporal condition for rendering a suggestion related to the content, wherein the temporal condition defines a particular amount of time, that, when elapsed, causes the suggestion related to the content to be rendered; and
in response to rendering of the document at the user interface of the client computing device:
causing the client computing device to:
monitor for satisfaction of the temporal condition, wherein monitoring for satisfaction of the temporal condition comprises:
monitoring an amount of time since the document is displayed at the user interface of the client computing device, and comparing the amount of time to the temporal condition; and
render the suggestion when the temporal condition is satisfied.

19. The method of claim 18, wherein the historical selection times are each relative to corresponding initial renderings of the document and wherein the temporal condition is relative to an initial rendering of the document.

20. The method of claim 18, further comprising:
identifying, for the client computing device or for a user account accessing the document at the computing device, a historical measure of suggestion selection;
wherein generating the temporal condition is based on the historical statistical distribution and the historical measure of suggestion selection.

* * * * *